(12) United States Patent
Agarwal et al.

(10) Patent No.: US 9,049,736 B2
(45) Date of Patent: Jun. 2, 2015

(54) VIDEO SUB-RESERVATION PROTOCOL IN A WIRELESS ECOSYSTEM

(75) Inventors: Peyush Agarwal, Milpitas, CA (US); James F. Dougherty, III, Morgan Hill, CA (US); Yasantha N. Rajakarunanayake, San Ramon, CA (US)

(73) Assignee: Broadcom Corporation, Irvine, CA (US)

( * ) Notice: Subject to any disclaimer, the term of this patent is extended or adjusted under 35 U.S.C. 154(b) by 827 days.

(21) Appl. No.: 13/192,390

(22) Filed: Jul. 27, 2011

(65) Prior Publication Data

US 2012/0307806 A1 Dec. 6, 2012

Related U.S. Application Data

(60) Provisional application No. 61/491,838, filed on May 31, 2011.

(51) Int. Cl.
*H04W 72/12* (2009.01)
*H04W 72/04* (2009.01)

(52) U.S. Cl.
CPC ...... *H04W 72/1242* (2013.01); *H04W 72/0486* (2013.01); *H04W 72/1252* (2013.01); *Y02B 60/50* (2013.01); *H04W 72/12* (2013.01); *H04W 72/1268* (2013.01); *H04W 72/1278* (2013.01)

(58) Field of Classification Search
CPC .. H04W 4/00; H04W 74/085; H04W 72/1242

USPC ............................. 370/329, 338, 443; 455/437
See application file for complete search history.

(56) References Cited

U.S. PATENT DOCUMENTS

| | | | |
|---|---|---|---|
| 7,106,715 B1 * | 9/2006 | Kelton et al. | 370/338 |
| 7,403,538 B1 * | 7/2008 | Ho | 370/443 |
| 7,787,416 B2 * | 8/2010 | Gidwani | 370/329 |
| 7,929,968 B2 * | 4/2011 | Joshi et al. | 455/437 |

* cited by examiner

*Primary Examiner* — Mark Rinehart
*Assistant Examiner* — Gbemileke Onamuti
(74) *Attorney, Agent, or Firm* — Garlick & Markison; Shayne X. Short

(57) ABSTRACT

Video sub-reservation protocol in a wireless ecosystem. Appropriate access is provided to a number of wireless communication devices to ensure very high performance and a high perceptual user experience with respect to media related content communications. Access to the communication medium (e.g., air within a wireless location system) is provided to various wireless communication devices in a manner as to minimize collisions and contention. In one instance, different respective access assignment periods are sub-divided to give respective communication medium access to various devices within the system. Such sub-reservation may be adaptive in response to any of a number of considerations (e.g., traffic, device processing history, etc.). Also, such sub-reservation may provide respective time specificity at or during which certain devices may conduct communications, but may also specify any other operational parameters (e.g., which frequency spectra to use, duration of such communications, modulation coding set (MCS) to use, etc.).

20 Claims, 14 Drawing Sheets

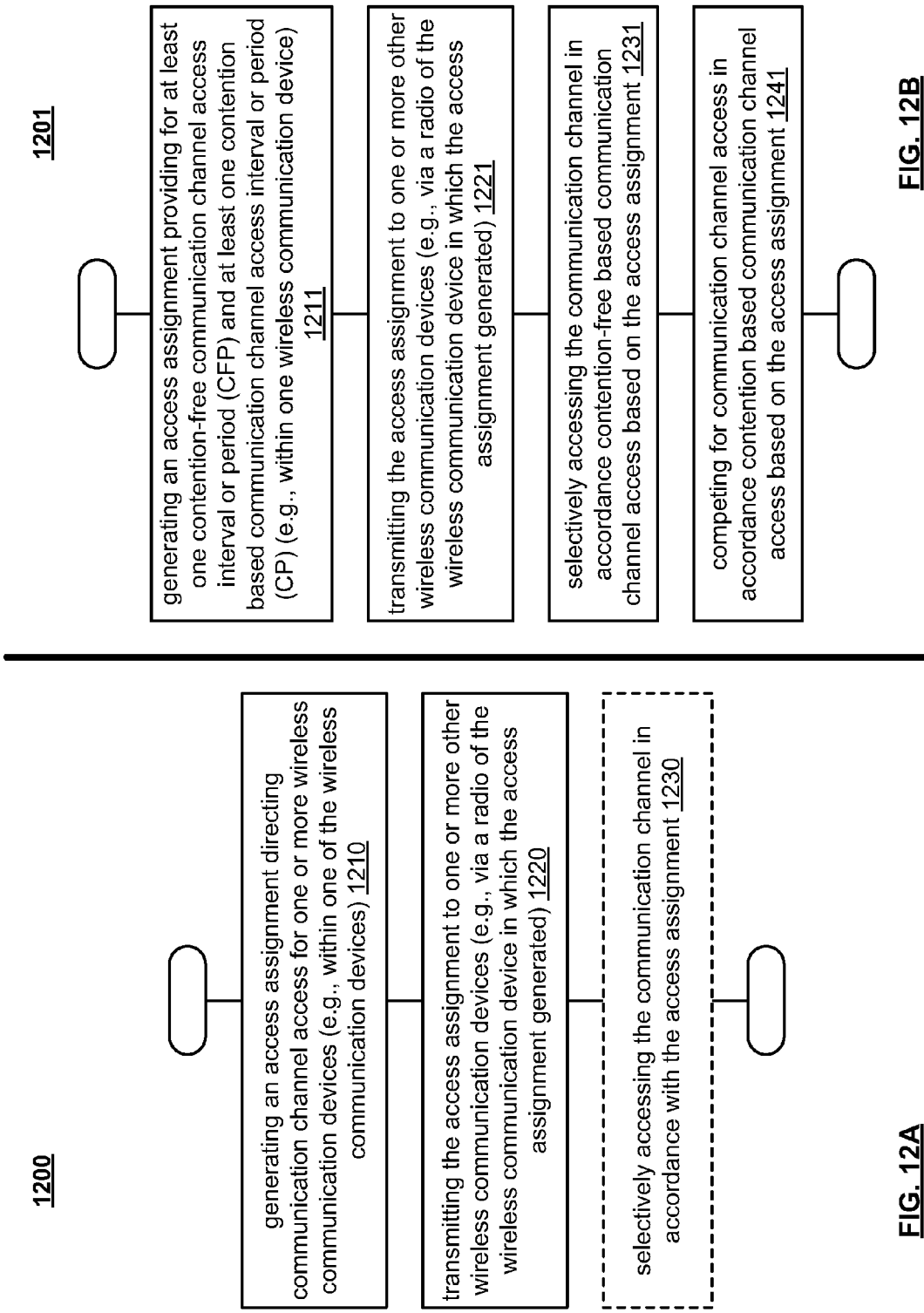

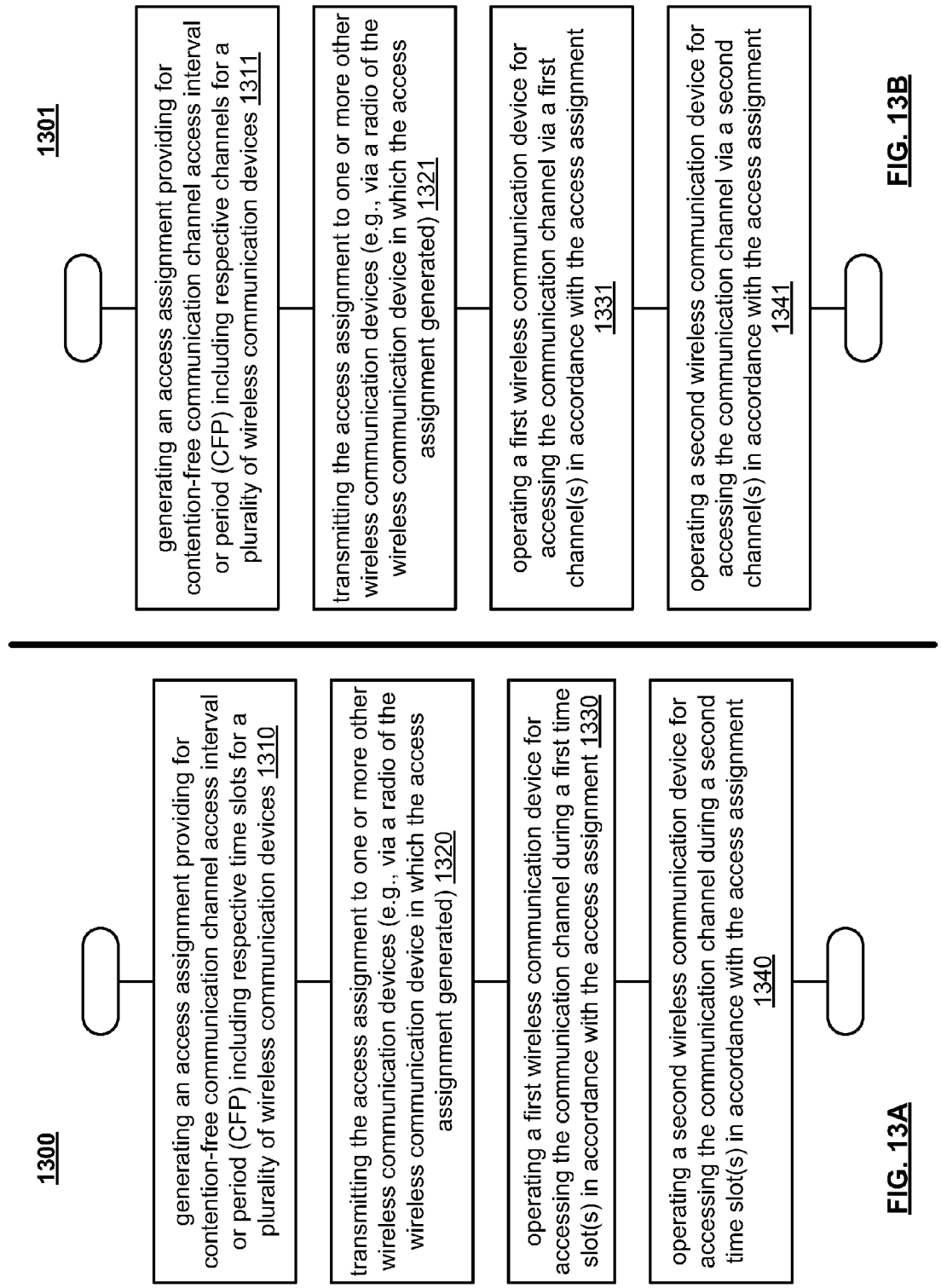

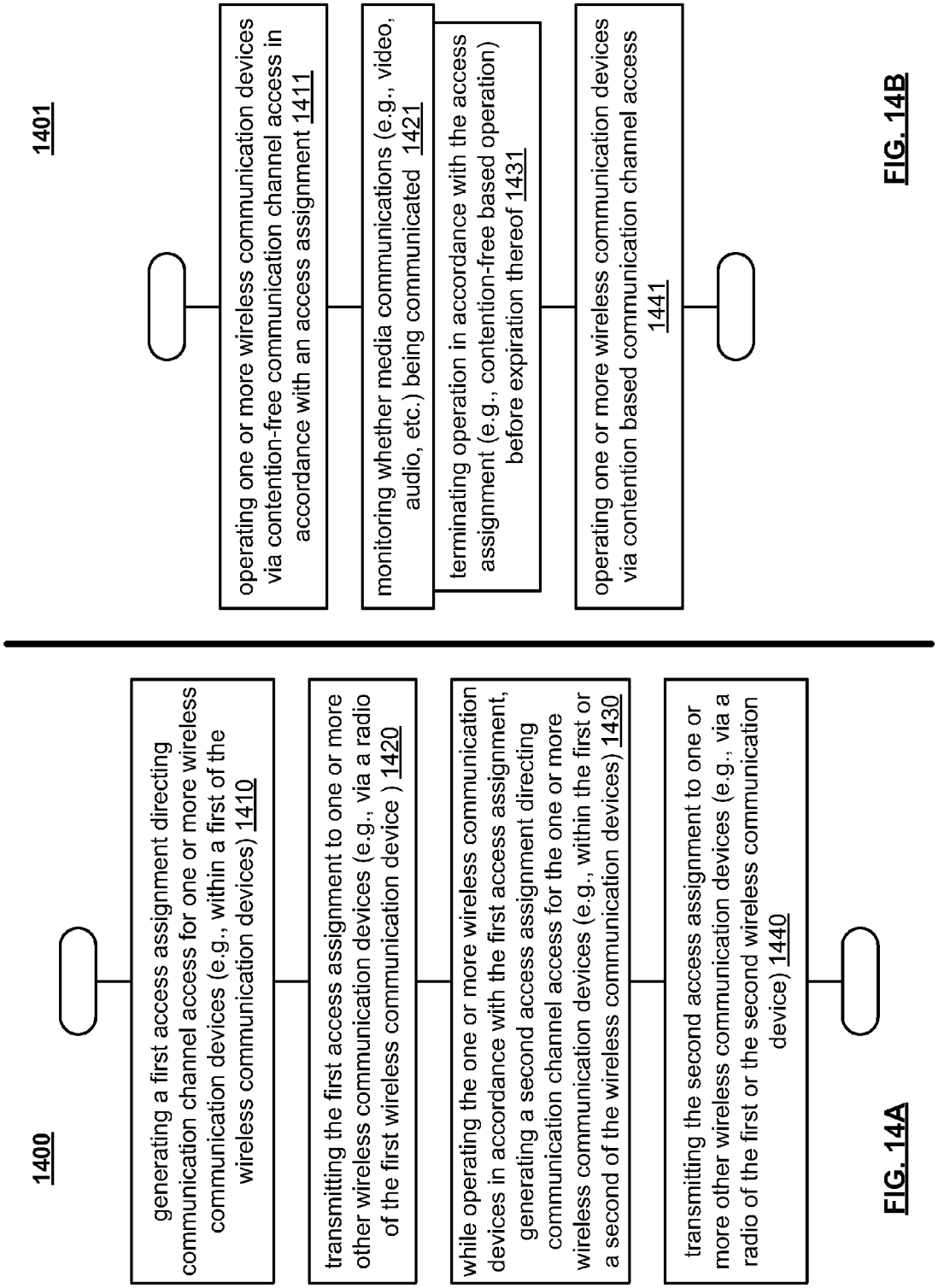

VIDEO SUB-RESERVATION PROTOCOL IN A WIRELESS ECOSYSTEM

CROSS REFERENCE TO RELATED PATENTS/PATENT APPLICATIONS

Provisional Priority Claims

The present U.S. Utility patent application claims priority pursuant to 35 U.S.C. §119(e) to the following U.S. Provisional Patent Application which is hereby incorporated herein by reference in its entirety and made part of the present U.S. Utility patent application for all purposes:

1. U.S. Provisional Patent Application Ser. No. 61/491,838, entitled "Media communications and signaling within wireless communication systems,", filed May 31, 2011, pending.

Incorporation by Reference

The following standards/draft standards are hereby incorporated herein by reference in their entirety and are made part of the present U.S. Utility patent application for all purposes:

1. WD1: Working Draft 1 of High-Efficiency Video Coding, Joint Collaborative Team on Video Coding (JCT-VC), of ITU-T SG16 WP3 and ISO/IEC JTC1/SC29/WG11, Thomas Wiegand, et al., 3rd Meeting: Guangzhou, C N, 7-15 Oct., 2010, Document: JCTVC-C403, 137 pages.

2. ISO/IEC 14496-10—MPEG-4 Part 10, AVC (Advanced Video Coding), alternatively referred to as H.264/MPEG-4 Part 10 or AVC (Advanced Video Coding), ITU H.264/MPEG4-AVC, or equivalent.

Incorporation by Reference

The following IEEE standards/draft IEEE standards are hereby incorporated herein by reference in their entirety and are made part of the present U.S. Utility patent application for all purposes:

1. IEEE Std 802.11™—2007, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," IEEE Computer Society, IEEE Std 802.11™—2007, (Revision of IEEE Std 802.11—1999), 1233 pages.

2. IEEE Std 802.11n™—2009, "IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput," IEEE Computer Society, IEEE Std 802.11n™—2009, (Amendment to IEEE Std 802.11™—2007 as amended by IEEE Std 802.11k™—2008, IEEE Std 802.11r™—2008, IEEE Std 802.11y™—2008, and IEEE Std 802.11r™—2009), 536 pages.

3. IEEE P802.11ac™/D1.0, May 2011, "Draft STANDARD for Information Technology—Telecommunications and information exchange between systems—Local and metropolitan area networks—Specific requirements, Part 11: Wireless LAN Medium Access Control (MAC) and Physical Layer (PHY) specifications, Amendment 5: Enhancements for Very High Throughput for Operation in Bands below 6 GHz," Prepared by the 802.11 Working Group of the 802 Committee, 263 total pages (pp. i-xxi, 1-242).

BACKGROUND OF THE INVENTION

1. Technical Field of the Invention

The invention relates generally to communication systems; and, more particularly, it relates to wireless communication systems and effectuating video communications therein in a contention-free manner.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11x, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies them. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier (PA). The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Typically, the transmitter will include one antenna for transmitting the RF signals, which are received by a single antenna, or multiple antennae (alternatively, antennas), of a receiver. When the receiver includes two or more antennae, the receiver will select one of them to receive the incoming RF signals. In this instance, the wireless communication between the transmitter and receiver is a single-output-single-input (SISO) communication, even if the receiver includes multiple antennae that are used as diversity antennae (i.e., selecting one of them to receive the incoming RF signals). For SISO wireless communications, a transceiver includes one transmitter and one receiver. Currently, most wireless local area networks (WLAN) that are IEEE 802.11, 802.11a, 802.11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennae and two or more receiver paths. Each of the antennae receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennae to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

With the various types of wireless communications (e.g., SISO, MISO, SIMO, and MIMO), and particularly within communication devices that may employ multiple communication paths therein, the present art does not provide an adequate solution by which various communications maybe performed and operated in a communication device without deleterious affecting one another.

In the context of wireless communications and particularly the transmission and receipt of signals therein that include media content (e.g., video, audio, etc.), certain considerations should be made that are not necessary within non-media related signaling. For example, certain non-media related signals do not suffer significant degradation of performance from latency, delay, etc. Often times, such media related content communications are relatively more time critical than non-media related content communications. Particularly in the context of wireless communications, the present art does not provide an adequate means by which media related content communications may be effectuated in a robust, reliable, and perceptually acceptable manner.

BRIEF DESCRIPTION OF THE SEVERAL VIEWS OF THE DRAWINGS

FIG. 12A, FIG. 12B, FIG. 13A, FIG. 13B, FIG. 14A, and FIG. 14B illustrate various embodiment of methods as may be performed in accordance with operation of various devices such as various wireless communication devices.

DETAILED DESCRIPTION OF THE INVENTION

Figure 1:
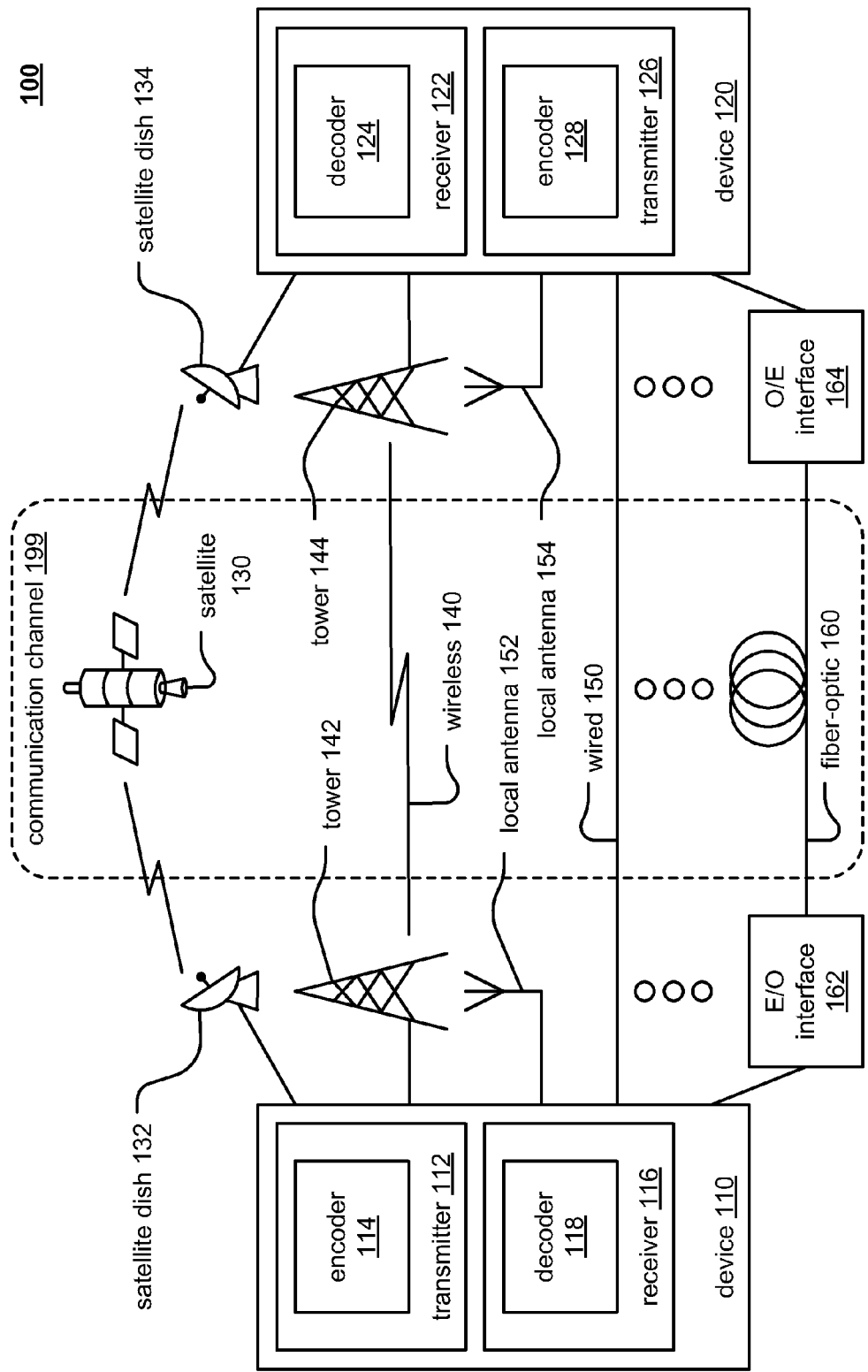
FIG. 1 and FIG. 2 are diagrams illustrating various embodiments of communication systems.

Within communication systems, signals are transmitted between various communication devices therein. The goal of digital communications systems is to transmit digital data from one location, or subsystem, to another either error free or with an acceptably low error rate. As shown in FIG. 1, data may be transmitted over a variety of communications channels in a wide variety of communication systems: magnetic media, wired, wireless, fiber, copper, and other types of media as well.

Figure 2:
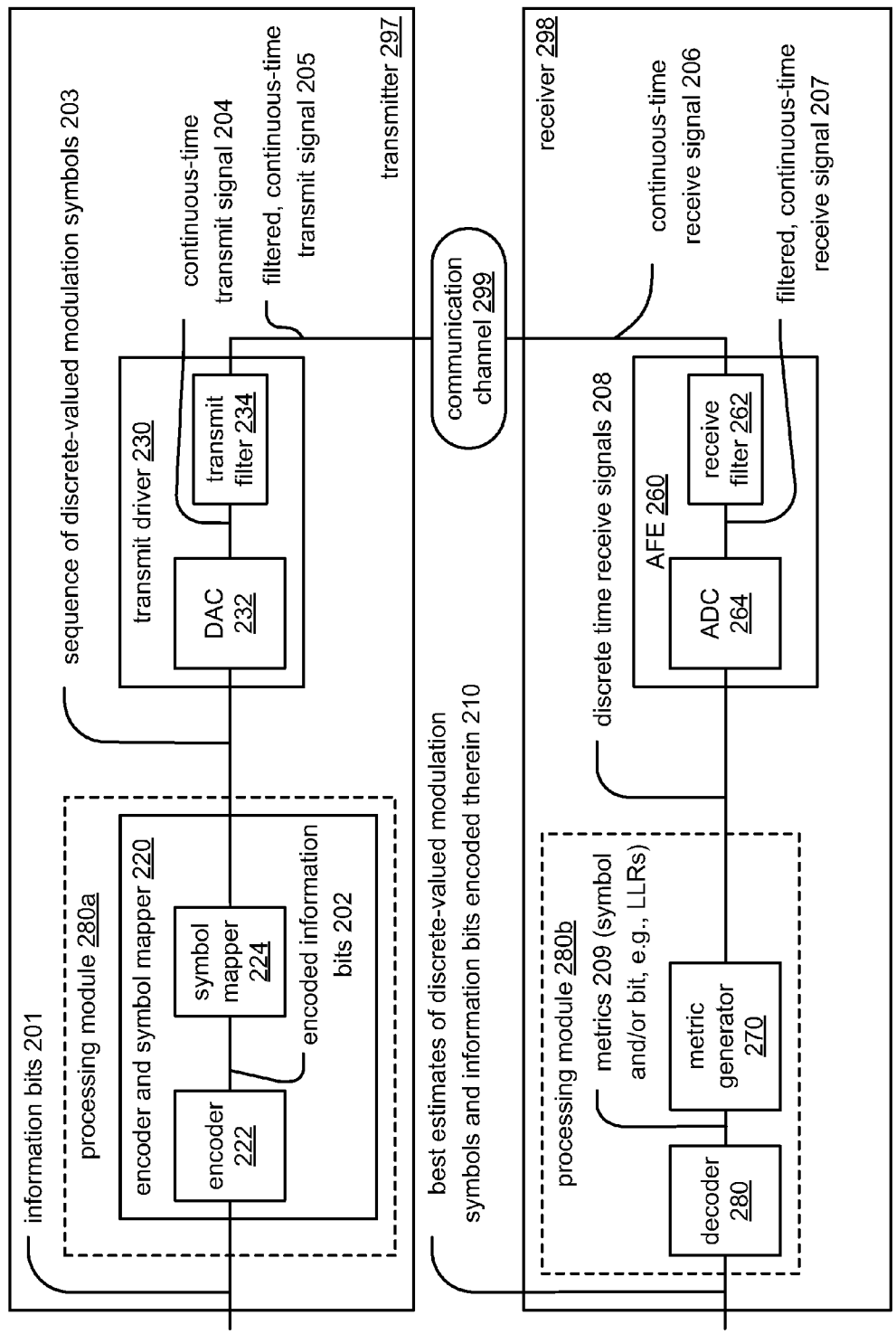

FIG. 1 and FIG. 2 are diagrams illustrating various embodiments of communication systems, 100, and 200, respectively.

Referring to FIG. 1, this embodiment of a communication system 100 is a communication channel 199 that communicatively couples a communication device 110 (including a transmitter 112 having an encoder 114 and including a receiver 116 having a decoder 118) situated at one end of the communication channel 199 to another communication device 120 (including a transmitter 126 having an encoder 128 and including a receiver 122 having a decoder 124) at the other end of the communication channel 199. In some embodiments, either of the communication devices 110 and 120 may only include a transmitter or a receiver. There are several different types of media by which the communication channel 199 may be implemented (e.g., a satellite communication channel 130 using satellite dishes 132 and 134, a wireless communication channel 140 using towers 142 and 144 and/or local antennae 152 and 154, a wired communication channel 150, and/or a fiber-optic communication channel 160 using electrical to optical (E/O) interface 162 and optical to electrical (O/E) interface 164)). In addition, more than one type of media may be implemented and interfaced together thereby forming the communication channel 199.

To reduce transmission errors that may undesirably be incurred within a communication system, error correction and channel coding schemes are often employed. Generally, these error correction and channel coding schemes involve the use of an encoder at the transmitter end of the communication channel 199 and a decoder at the receiver end of the communication channel 199.

Any of various types of ECC codes described can be employed within any such desired communication system (e.g., including those variations described with respect to FIG. 1), any information storage device (e.g., hard disk drives (HDDs), network information storage devices and/or servers, etc.) or any application in which information encoding and/or decoding is desired.

Generally speaking, when considering a communication system in which video data is communicated from one location, or subsystem, to another, video data encoding may generally be viewed as being performed at a transmitting end of the communication channel 199, and video data decoding may generally be viewed as being performed at a receiving end of the communication channel 199.

Also, while the embodiment of this diagram shows bi-directional communication being capable between the communication devices 110 and 120, it is of course noted that, in some embodiments, the communication device 110 may include only video data encoding capability, and the communication device 120 may include only video data decoding capability, or vice versa (e.g., in a uni-directional communication embodiment such as in accordance with a video broadcast embodiment).

Referring to the communication system 200 of FIG. 2, at a transmitting end of a communication channel 299, information bits 201 (e.g., corresponding particularly to video data in one embodiment) are provided to a transmitter 297 that is operable to perform encoding of these information bits 201 using an encoder and symbol mapper 220 (which may be viewed as being distinct functional blocks 222 and 224, respectively) thereby generating a sequence of discrete-valued modulation symbols 203 that is provided to a transmit driver 230 that uses a DAC (Digital to Analog Converter) 232 to generate a continuous-time transmit signal 204 and a transmit filter 234 to generate a filtered, continuous-time transmit signal 205 that substantially comports with the communication channel 299. At a receiving end of the communication channel 299, continuous-time receive signal 206 is provided to an AFE (Analog Front End) 260 that includes a receive filter 262 (that generates a filtered, continuous-time receive signal 207) and an ADC (Analog to Digital Converter) 264 (that generates discrete-time receive signals 208). A metric generator 270 calculates metrics 209 (e.g., on either a symbol and/or bit basis) that are employed by a decoder 280 to make best estimates of the discrete-valued modulation symbols and information bits encoded therein 210.

Within each of the transmitter 297 and the receiver 298, any desired integration of various components, blocks, functional blocks, circuitries, etc. therein may be implemented. For example, this diagram shows a processing module 280a as including the encoder and symbol mapper 220 and all associated, corresponding components therein, and a processing module 280 is shown as including the metric generator 270 and the decoder 280 and all associated, corresponding components therein. Such processing modules 280a and 280b may be respective integrated circuits. Of course, other boundaries and groupings may alternatively be performed without departing from the scope and spirit of the invention. For example, all components within the transmitter 297 may be included within a first processing module or integrated circuit, and all components within the receiver 298 may be included within a second processing module or integrated circuit. Alternatively, any other combination of components within each of the transmitter 297 and the receiver 298 may be made in other embodiments.

As with the previous embodiment, such a communication system 200 may be employed for the communication of video data is communicated from one location, or subsystem, to another (e.g., from transmitter 297 to the receiver 298 via the communication channel 299).

Figure 3:
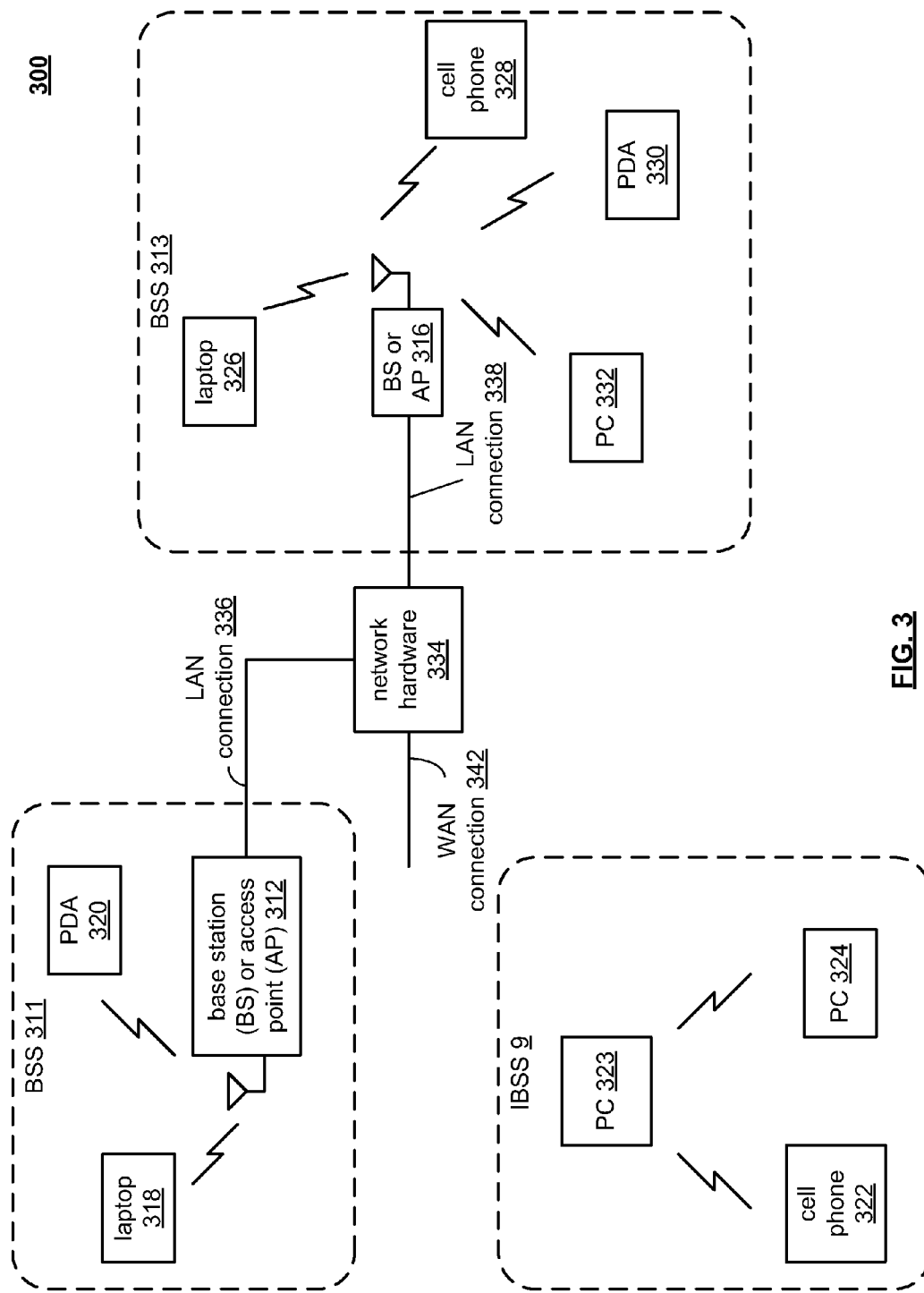
FIG. 3 is a diagram illustrating an alternative embodiment of a wireless communication system.

FIG. 3 is a diagram illustrating an embodiment of a wireless communication system 300. The wireless communication system 300 includes a plurality of base stations and/or access points 312, 316, a plurality of wireless communication devices 318-332 and a network hardware component 334. Note that the network hardware 334, which may be a router, switch, bridge, modem, system controller, etc., provides a wide area network connection 342 for the communication system 300. Further note that the wireless communication devices 318-332 may be laptop host computers 318 and 326, personal digital assistant hosts 320 and 330, personal computer hosts 324 and 332 and/or cellular telephone hosts 322 and 328.

Wireless communication devices 322, 323, and 324 are located within an independent basic service set (IBSS) area and communicate directly (i.e., point to point). In this configuration, these devices 322, 323, and 324 may only communicate with each other. To communicate with other wireless communication devices within the system 300 or to communicate outside of the system 300, the devices 322, 323, and/or 324 need to affiliate with one of the base stations or access points 312 or 316.

The base stations or access points 312, 316 are located within basic service set (BSS) areas 311 and 313, respectively, and are operably coupled to the network hardware 334 via local area network connections 336, 338. Such a connection provides the base station or access point 312-316 with connectivity to other devices within the system 300 and provides connectivity to other networks via the WAN connection 342. To communicate with the wireless communication devices within its BSS 311 or 313, each of the base stations or access points 312-116 has an associated antenna or antenna array. For instance, base station or access point 312 wirelessly communicates with wireless communication devices 318 and 320 while base station or access point 316 wirelessly communicates with wireless communication devices 326-332. Typically, the wireless communication devices register with a particular base station or access point 312, 316 to receive services from the communication system 300.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio.

Figure 4:
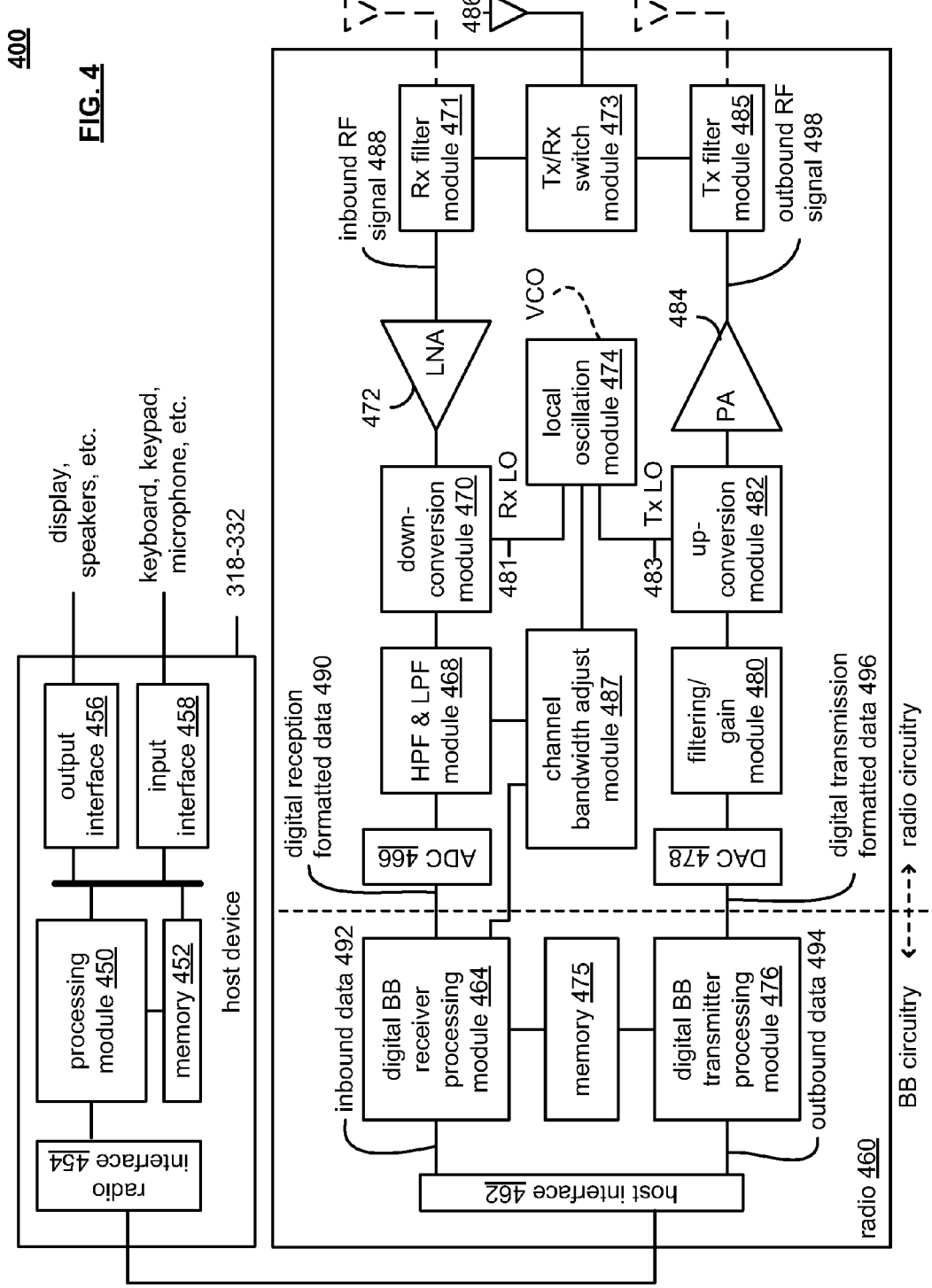
FIG. 4 is a diagram illustrating an embodiment of a wireless communication device.

FIG. 4 is a diagram illustrating an embodiment 300 of a wireless communication device that includes the host device 318-332 and an associated radio 460. For cellular telephone hosts, the radio 460 is a built-in component. For personal digital assistants hosts, laptop hosts, and/or personal computer hosts, the radio 460 may be built-in or an externally coupled component.

As illustrated, the host device 318-332 includes a processing module 450, memory 452, a radio interface 454, an input interface 458, and an output interface 456. The processing module 450 and memory 452 execute the corresponding instructions that are typically done by the host device. For example, for a cellular telephone host device, the processing module 450 performs the corresponding communication functions in accordance with a particular cellular telephone standard.

The radio interface 454 allows data to be received from and sent to the radio 460. For data received from the radio 460 (e.g., inbound data), the radio interface 454 provides the data to the processing module 450 for further processing and/or routing to the output interface 456. The output interface 456 provides connectivity to an output display device such as a display, monitor, speakers, etc., such that the received data may be displayed. The radio interface 454 also provides data from the processing module 450 to the radio 460. The processing module 450 may receive the outbound data from an input device such as a keyboard, keypad, microphone, etc., via the input interface 458 or generate the data itself. For data received via the input interface 458, the processing module 450 may perform a corresponding host function on the data and/or route it to the radio 460 via the radio interface 454.

Radio 460 includes a host interface 462, digital receiver processing module 464, an analog-to-digital converter 466, a high pass and low pass filter module 468, an IF mixing down conversion stage 470, a receiver filter 471, a low noise amplifier 472, a transmitter/receiver switch 473, a local oscillation module 474 (which may be implemented, at least in part, using a voltage controlled oscillator (VCO)), memory 475, a digital transmitter processing module 476, a digital-to-analog converter 478, a filtering/gain module 480, an IF mixing up conversion stage 482, a power amplifier 484, a transmitter filter module 485, a channel bandwidth adjust module 487, and an antenna 486. The antenna 486 may be a single antenna that is shared by the transmit and receive paths as regulated by the Tx/Rx switch 473, or may include separate antennas for the transmit path and receive path. The antenna implementation will depend on the particular standard to which the wireless communication device is compliant.

The digital receiver processing module 464 and the digital transmitter processing module 476, in combination with operational instructions stored in memory 475, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 464 and 476 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 475 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 464 and/or 476 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 460 receives outbound data 494 from the host device via the host interface 462. The host interface 462 routes the outbound data 494 to the digital transmitter processing module 476, which processes the outbound data 494 in accordance with a particular wireless communication standard (e.g., IEEE 802.11, Bluetooth, ZigBee, WiMAX (Worldwide Interoperability for Microwave Access), any other type of radio frequency based network protocol and/or variations thereof etc.) to produce outbound baseband signals 496. The outbound baseband signals 496 will be digital base-band signals (e.g., have a zero IF) or digital low IF signals, where the low IF typically will be in the frequency range of one hundred kHz (kilo-Hertz) to a few MHz (Mega-Hertz).

The digital-to-analog converter 478 converts the outbound baseband signals 496 from the digital domain to the analog domain. The filtering/gain module 480 filters and/or adjusts the gain of the analog signals prior to providing it to the IF mixing stage 482. The IF mixing stage 482 converts the analog baseband or low IF signals into RF signals based on a transmitter local oscillation 483 provided by local oscillation module 474. The power amplifier 484 amplifies the RF signals to produce outbound RF signals 498, which are filtered by the transmitter filter module 485. The antenna 486 transmits the outbound RF signals 498 to a targeted device such as a base station, an access point and/or another wireless communication device.

The radio 460 also receives inbound RF signals 488 via the antenna 486, which were transmitted by a base station, an access point, or another wireless communication device. The antenna 486 provides the inbound RF signals 488 to the receiver filter module 471 via the Tx/Rx switch 473, where the Rx filter 471 bandpass filters the inbound RF signals 488. The Rx filter 471 provides the filtered RF signals to low noise amplifier 472, which amplifies the signals 488 to produce an amplified inbound RF signals. The low noise amplifier 472 provides the amplified inbound RF signals to the IF mixing module 470, which directly converts the amplified inbound RF signals into an inbound low IF signals or baseband signals based on a receiver local oscillation 481 provided by local oscillation module 474. The down conversion module 470 provides the inbound low IF signals or baseband signals to the filtering/gain module 468. The high pass and low pass filter module 468 filters, based on settings provided by the channel bandwidth adjust module 487, the inbound low IF signals or the inbound baseband signals to produce filtered inbound signals.

The analog-to-digital converter 466 converts the filtered inbound signals from the analog domain to the digital domain to produce inbound baseband signals 490, where the inbound baseband signals 490 will be digital base-band signals or digital low IF signals, where the low IF typically will be in the frequency range of one hundred kHz to a few MHz. The digital receiver processing module 464, based on settings provided by the channel bandwidth adjust module 487, decodes, descrambles, demaps, and/or demodulates the inbound baseband signals 490 to recapture inbound data 492 in accordance with the particular wireless communication standard being implemented by radio 460. The host interface 462 provides the recaptured inbound data 492 to the host device 318-332 via the radio interface 454.

As one of average skill in the art will appreciate, the wireless communication device of the embodiment 400 of FIG. 4 may be implemented using one or more integrated circuits. For example, the host device may be implemented on one integrated circuit, the digital receiver processing module 464, the digital transmitter processing module 476 and memory 475 may be implemented on a second integrated circuit, and the remaining components of the radio 460, less the antenna 486, may be implemented on a third integrated circuit. As an alternate example, the radio 460 may be implemented on a single integrated circuit. As yet another example, the processing module 450 of the host device and the digital receiver and transmitter processing modules 464 and 476 may be a common processing device implemented on a single integrated circuit. Further, the memory 452 and memory 475 may be implemented on a single integrated circuit and/or on the same integrated circuit as the common processing modules of processing module 450 and the digital receiver and transmitter processing module 464 and 476.

Any of the various embodiments of communication device that may be implemented within various communication systems can incorporate functionality to perform communication via more than one standard, protocol, or other predetermined means of communication. For example, a single communication device, designed in accordance with certain aspects of the invention, can include functionality to perform communication in accordance with a first protocol, a second protocol, and/or a third protocol, and so on. These various protocols may be WiMAX (Worldwide Interoperability for Microwave Access) protocol, a protocol that complies with a wireless local area network (WLAN/WiFi) (e.g., one of the IEEE (Institute of Electrical and Electronics Engineer) 802.11 protocols such as 802.11a, 802.11b, 802.11g, 802.11n, 802.11ac, etc.), a Bluetooth protocol, or any other predetermined means by which wireless communication may be effectuated.

Figure 5:
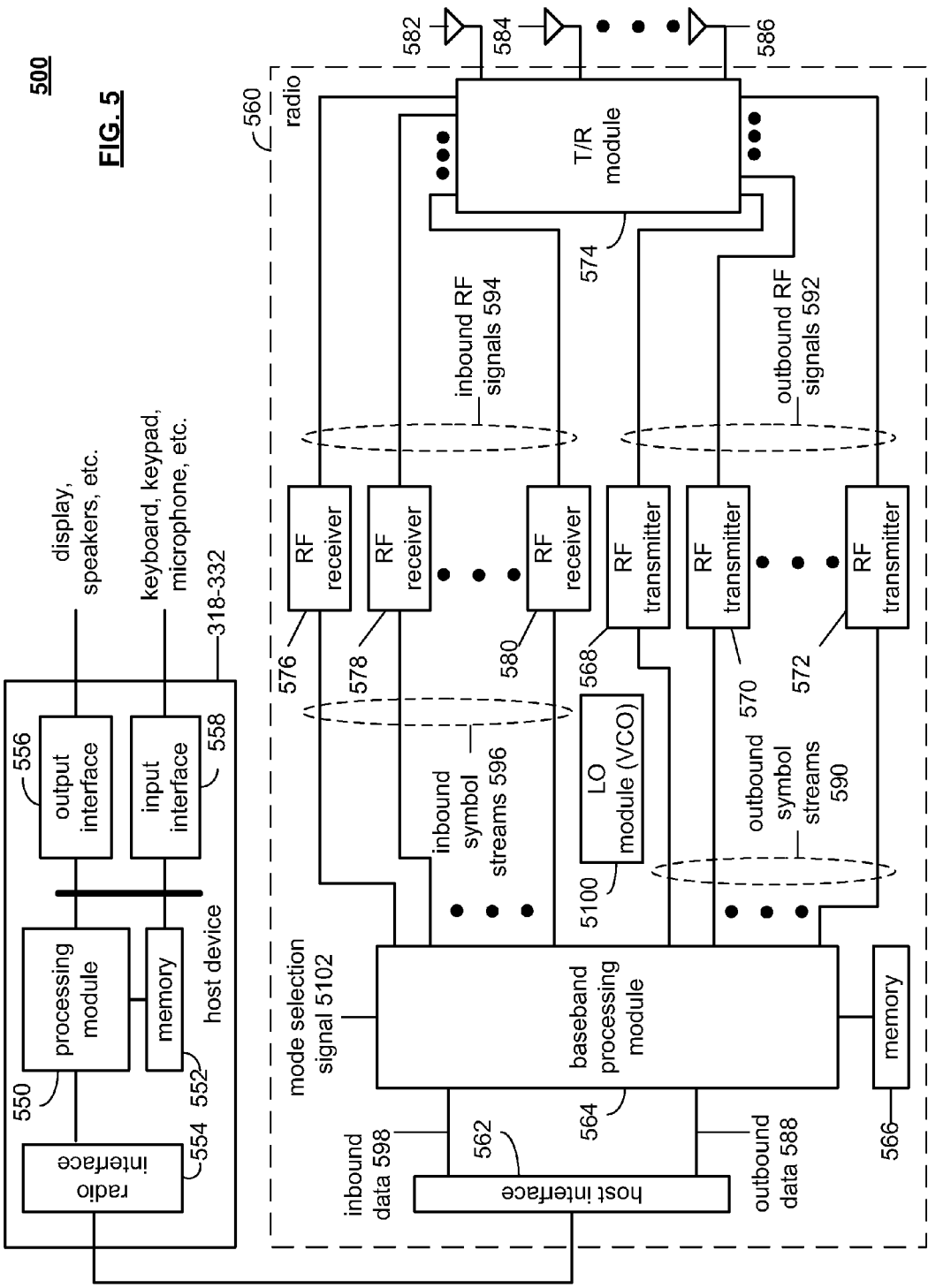
FIG. 5 is a diagram illustrating an alternative embodiment of a wireless communication device.

FIG. 5 is a diagram illustrating an alternative embodiment of a wireless communication device that includes the host device 318-332 and an associated at least one radio 560. For cellular telephone hosts, the radio 560 is a built-in component. For personal digital assistants hosts, laptop hosts, and/or personal computer hosts, the radio 560 may be built-in or an externally coupled component. For access points or base stations, the components are typically housed in a single structure.

As illustrated, the host device 318-332 includes a processing module 550, memory 552, radio interface 554, input interface 558 and output interface 556. The processing module 550 and memory 552 execute the corresponding instructions that are typically done by the host device. For example, for a cellular telephone host device, the processing module 550 performs the corresponding communication functions in accordance with a particular cellular telephone standard.

The radio interface 554 allows data to be received from and sent to the radio 560. For data received from the radio 560 (e.g., inbound data), the radio interface 554 provides the data to the processing module 550 for further processing and/or routing to the output interface 556. The output interface 556 provides connectivity to an output display device such as a display, monitor, speakers, et cetera such that the received data may be displayed. The radio interface 554 also provides data from the processing module 550 to the radio 560. The processing module 550 may receive the outbound data from an input device such as a keyboard, keypad, microphone, et cetera via the input interface 558 or generate the data itself. For data received via the input interface 558, the processing module 550 may perform a corresponding host function on the data and/or route it to the radio 560 via the radio interface 554.

Radio 560 includes a host interface 562, a baseband processing module 564, memory 566, a plurality of radio frequency (RF) transmitters 568-372, a transmit/receive (T/R) module 574, a plurality of antennae 582-386, a plurality of RF receivers 576-380, and a local oscillation module 5100 (which may be implemented, at least in part, using a VCO). The baseband processing module 564, in combination with operational instructions stored in memory 566, execute digital receiver functions and digital transmitter functions, respectively. The digital receiver functions, include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions, include, but are not limited to, scrambling, encoding, interleaving, constellation mapping, modulation, inverse fast Fourier transform, cyclic prefix addition, space and time encoding, and/or digital baseband to IF conversion. The baseband processing modules 564 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 566 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 564 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 560 receives outbound data 588 from the host device via the host interface 562. The baseband processing module 564 receives the outbound data 588 and, based on a mode selection signal 5102, produces one or more outbound symbol streams 590. The mode selection signal 5102 will indicate a particular mode as are illustrated in the mode selection tables, which appear at the end of the detailed discussion. Such operation as described herein is exemplary with respect to at least one possible embodiment, and it is of course noted that the various aspects and principles, and their equivalents, of the invention may be extended to other embodiments without departing from the scope and spirit of the invention.

For example, the mode selection signal 5102, with reference to table 1 may indicate a frequency band of 2.4 GHz or 5 GHz, a channel bandwidth of 20 or 22 MHz (e.g., channels of 20 or 22 MHz width) and a maximum bit rate of 54 megabits-per-second. In other embodiments, the channel bandwidth may extend up to 1.28 GHz or wider with supported maximum bit rates extending to 1 gigabit-per-second or greater. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. As is further illustrated in table 1, a code rate is supplied as well as number of coded bits per subcarrier (NBPSC), coded bits per OFDM symbol (NCBPS), and data bits per OFDM symbol (NDBPS).

The mode selection signal may also indicate a particular channelization for the corresponding mode which for the information in table 1 is illustrated in table 2. As shown, table 2 includes a channel number and corresponding center frequency. The mode select signal may further indicate a power spectral density mask value which for table 1 is illustrated in table 3. The mode select signal may alternatively indicate rates within table 4 that has a 5 GHz frequency band, 20 MHz channel bandwidth and a maximum bit rate of 54 megabits-per-second. If this is the particular mode select, the channelization is illustrated in table 5. As a further alternative, the mode select signal 5102 may indicate a 2.4 GHz frequency band, 20 MHz channels and a maximum bit rate of 192 megabits-per-second as illustrated in table 6. In table 6, a number of antennae may be utilized to achieve the higher bit rates. In this instance, the mode select would further indicate the number of antennae to be utilized. Table 7 illustrates the channelization for the set-up of table 6. Table 8 illustrates yet another mode option where the frequency band is 2.4 GHz, the channel bandwidth is 20 MHz and the maximum bit rate is 192 megabits-per-second. The corresponding table 8 includes various bit rates ranging from 12 megabits-per-second to 216 megabits-per-second utilizing 2-4 antennae and a spatial time encoding rate as indicated. Table 9 illustrates the channelization for table 8. The mode select signal 102 may further indicate a particular operating mode as illustrated in table 10, which corresponds to a 5 GHz frequency band having 40 MHz frequency band having 40 MHz channels and a maximum bit rate of 486 megabits-per-second. As shown in table 10, the bit rate may range from 13.5 megabits-per-second to 486 megabits-per-second utilizing 1-4 antennae and a corresponding spatial time code rate. Table 10 further illustrates a particular modulation scheme code rate and NBPSC values. Table 11 provides the power spectral density mask for table 10 and table 12 provides the channelization for table 10.

It is of course noted that other types of channels, having different bandwidths, may be employed in other embodiments without departing from the scope and spirit of the invention. For example, various other channels such as those having 80 MHz, 120 MHz, and/or 160 MHz of bandwidth may alternatively be employed such as in accordance with IEEE Task Group ac (TGac VHTL6).

The baseband processing module 564, based on the mode selection signal 5102 produces the one or more outbound symbol streams 590 from the output data 588. For example, if the mode selection signal 5102 indicates that a single transmit antenna is being utilized for the particular mode that has been selected, the baseband processing module 564 will produce a single outbound symbol stream 590. Alternatively, if the mode select signal indicates 2, 3 or 4 antennae, the baseband processing module 564 will produce 2, 3 or 4 outbound symbol streams 590 corresponding to the number of antennae from the output data 588.

Depending on the number of outbound streams 590 produced by the baseband module 564, a corresponding number of the RF transmitters 568-372 will be enabled to convert the outbound symbol streams 590 into outbound RF signals 592. The transmit/receive module 574 receives the outbound RF signals 592 and provides each outbound RF signal to a corresponding antenna 582-386.

When the radio 560 is in the receive mode, the transmit/receive module 574 receives one or more inbound RF signals via the antennae 582-386. The T/R module 574 provides the inbound RF signals 594 to one or more RF receivers 576-380. The RF receiver 576-380 converts the inbound RF signals 594 into a corresponding number of inbound symbol streams 596. The number of inbound symbol streams 596 will correspond to the particular mode in which the data was received (recall that the mode may be any one of the modes illustrated in tables 1-12). The baseband processing module 560 receives the inbound symbol streams 590 and converts them into inbound data 598, which is provided to the host device 318-332 via the host interface 562.

In one embodiment of radio 560 it includes a transmitter and a receiver. The transmitter may include a MAC module, a PLCP module, and a PMD module. The Medium Access Control (MAC) module, which may be implemented with the processing module 564, is operably coupled to convert a MAC Service Data Unit (MSDU) into a MAC Protocol Data Unit (MPDU) in accordance with a WLAN protocol. The Physical Layer Convergence Procedure (PLCP) Module, which may be implemented in the processing module 564, is operably coupled to convert the MPDU into a PLCP Protocol Data Unit (PPDU) in accordance with the WLAN protocol. The Physical Medium Dependent (PMD) module is operably coupled to convert the PPDU into a plurality of radio frequency (RF) signals in accordance with one of a plurality of operating modes of the WLAN protocol, wherein the plurality of operating modes includes multiple input and multiple output combinations.

An embodiment of the Physical Medium Dependent (PMD) module includes an error protection module, a demultiplexing module, and a plurality of direction conversion modules. The error protection module, which may be implemented in the processing module 564, is operably coupled to restructure a PPDU (PLCP (Physical Layer Convergence Procedure) Protocol Data Unit) to reduce transmission errors producing error protected data. The demultiplexing module is operably coupled to divide the error protected data into a plurality of error protected data streams The plurality of direct conversion modules is operably coupled to convert the plurality of error protected data streams into a plurality of radio frequency (RF) signals.

It is also noted that the wireless communication device of this diagram, as well as others described herein, may be implemented using one or more integrated circuits. For example, the host device may be implemented on one integrated circuit, the baseband processing module 564 and memory 566 may be implemented on a second integrated circuit, and the remaining components of the radio 560, less the antennae 582-586, may be implemented on a third integrated circuit. As an alternate example, the radio 560 may be implemented on a single integrated circuit. As yet another example, the processing module 550 of the host device and the baseband processing module 564 may be a common processing device implemented on a single integrated circuit. Further, the memory 552 and memory 566 may be implemented on a single integrated circuit and/or on the same integrated circuit as the common processing modules of processing module 550 and the baseband processing module 564.

The previous diagrams and their associated written description illustrate some possible embodiments by which a wireless communication device may be constructed and implemented. In some embodiments, more than one radio (e.g., such as multiple instantiations of the radio 460, the radio 560, a combination thereof, or even another implementation of a radio) is implemented within a wireless communication device. For example, a single wireless communication device can include multiple radios therein to effectuate simultaneous transmission of two or more signals. Also, multiple radios within a wireless communication device can effectuate simultaneous reception of two or more signals, or transmission of one or more signals at the same time as reception of one or more other signals (e.g., simultaneous transmission/reception).

Within the various diagrams and embodiments described and depicted herein, wireless communication devices may generally be referred to as WDEVs, DEVs, TXs, and/or RXs. It is noted that such wireless communication devices may be wireless stations (STAs), access points (APs), or any other type of wireless communication device without departing from the scope and spirit of the invention. Generally speaking, wireless communication devices that are APs may be referred to as transmitting or transmitter wireless communication devices, and wireless communication devices that are STAs may be referred to as receiving or receiver wireless communication devices in certain contexts.

Of course, it is noted that the general nomenclature employed herein wherein a transmitting wireless communication device (e.g., such as being an AP, or a STA operating as an 'AP' with respect to other STAs) initiates communications, and/or operates as a network controller type of wireless communication device, with respect to a number of other, receiving wireless communication devices (e.g., such as being STAs), and the receiving wireless communication devices (e.g., such as being STAs) responding to and cooperating with the transmitting wireless communication device in supporting such communications.

Of course, while this general nomenclature of transmitting wireless communication device(s) and receiving wireless communication device(s) may be employed to differentiate the operations as performed by such different wireless communication devices within a communication system, all such wireless communication devices within such a communication system may of course support bi-directional communications to and from other wireless communication devices within the communication system. In other words, the various types of transmitting wireless communication device(s) and receiving wireless communication device(s) may all support bi-directional communications to and from other wireless communication devices within the communication system.

Various aspects and principles, and their equivalents, of the invention as presented herein may be adapted for use in various standards, protocols, and/or recommended practices (including those currently under development) such as those in accordance with IEEE 802.11x (e.g., where x is a, b, g, n, ac, ah, ad, af, etc.).

In accordance with the delivery of video signaling between and among various wireless communication devices within one or more wireless communication systems and/or networks, a sub reservation protocol is presented herein by which access to the communication medium (e.g., to the air) is effectuated within a coordinated manner. In the context of communication of video signaling among various such wireless communication devices, random access to the communication medium (e.g., to the air) by those various wireless communication devices could unfortunately lead to deleterious effects. For example, collisions among respective communications could occur, certain wireless communication devices may not be able to gain access to the communication medium to effectuate transmission of video signaling in accordance with a desired level of quality of service, etc.

In some embodiments, one of the wireless communication devices within a given wireless communication system serves as a coordinating device. That is to say, within one embodiment operating in accordance with a standard, protocol, and/or recommended practice corresponding to that of a wireless local area network (WLAN/WiFi), one of the wireless communication devices therein may be a coordinating device (e.g., such as an access point (AP) operating within a wireless communication system including at least one AP and a number of clients, wireless terminals, stations (STAs)).

Generally speaking, a sub-reservation protocol implemented in accordance with in accordance with various aspects, and their equivalents, of the invention provides for, among other things, transmission of video signaling among various wireless communication devices in a coordinated manner. Certain embodiments operate in accordance with providing for divided access to the communication medium. That is to say, in such embodiments, access to the communication medium is coordinated such that the wireless communication devices are respectively afforded access to the communication medium in a coordinated way. Some examples of effectuating access for multiple wireless communication devices include time division multiple access (TDMA), code division multiple access (CDMA), some combination thereof, among other approaches by which multiple access may be effectuated.

In an embodiment operating in accordance with some form of time division granted access (e.g., TDMA), an access assignment may be provided from a coordinating device to other devices within the wireless communication system that will govern the manner by which respective devices therein have access to the communication medium. In accordance with a time slotted implementation for assigning channel access (e.g., TDMA) embodiment, such a sub-reservation protocol may be viewed as a timeslot reservation protocol.

Such an access assignment may be fixed or predetermined; for example, a default or predetermined access assignment may be provided from a coordinating device to the other device. In certain embodiments, a number of predetermined access assignments may be employed by a coordinating device (e.g., locally stored therein, retrieved from another device or database, etc.), and at least one of those predetermined access assignments is employed at any given time.

Alternatively, different respective access assignments may be adaptively generated and/or modified by a coordinating device (or alternatively in coordination/cooperation between the coordinating device and at least one other of the devices) such that an access assignment can be generated in real-time in response to one or more operating conditions of the overall wireless communication system. For example, allocation to the communication medium may be based upon quality of service (QoS) of competing client traffic among the various devices within the wireless communication system. Such competing client traffic may be media (e.g., audio and/or video content) or it may be non-media (e.g., data, management, control, etc. related). Also, by providing for adaptation of an access assignment, various periods of time within a given access assignment period may vary. That is to say, certain sub-portions of an access assignment period may be in accordance with one operational mode, and other support of an access assignment period may be in accordance with at least one other operational mode. For example, a first sub-portion may be in accordance with time slotted reservation (e.g., TDMA), another sub-portion may be in accordance with some contention-based operational mode (e.g., carrier sense multiple access/collision avoidance (CSMA/CA)), and yet another sub-portion may be in accordance with yet another multiple access operational mode (e.g., code division multiple access (CDMA)). The particular allocation of respective sub-portions of an access assignment period may be different within respective access assignments (e.g., as may be modified based upon one or more considerations). That is to say, each respective access assignment or sub-reservation protocol frame need not be identical.

In addition, as mentioned, additional variants to providing respective timeslot assignments to respective devices may be performed. For example, handoffs (e.g., such as selectively operating in accordance with unicast and multicast operational modes) among various respective wireless communication channels may be performed. For example, a given coordinating device (e.g., an AP such as within a WLAN embodiment), may include multiple radios therein for supporting simultaneous servicing of respective wireless communication channels.

In accordance with an operational mode corresponding to CDMA, multiple access to the communication medium may be provided simultaneously to multiple devices within a wireless communication system. It is noted that any combination of multiple operational modes (e.g., TDMA, CDMA, CSMA/CA, etc.) may be included within a given access assignment. That is to say, different respective sub-portions or sub-periods of a given access assignment period may correspond respectively to different operational modes. Alternatively, a first access assignment period may correspond to a first operational mode, a second access assignment period may correspond to a second operational mode, and a third access assignment period may correspond to a third operational mode, etc.

It is noted that while such a sub-reservation protocol is operative to address considerations as may be particularly pertaining to the delivery of media (e.g., audio and/or video) communications via one or more wireless communication channels within a wireless ecosystem, there will be certain communications within such an environment that are not particularly media. For example, certain communications may be exclusively data, feedback, management, control, and/or be communications corresponding to other types of non-media communications. When non-media communications are to be made among various devices within such a wireless ecosystem, and operational mode may switch from a contention-free access operational mode to a contention based operational mode (e.g., such as with respect to one or more contention-free based periods (CFPs) and/or one or more contention based periods (CPs)). For example, with respect to non-media communications that may not be particularly time sensitive, a contention based operational mode may be employed. For example, underutilized bandwidth within a given communication channel may be allocated particularly for use by certain of the devices within the wireless ecosystem in accordance with a contention based operational mode. In other words, a particular portion of the bandwidth of such a channel may be allocated for use by one or more of the devices in accordance with a contention-free operational mode, while another portion of the bandwidth of that same channel may be allocated for use by one or more of the devices in accordance with a contention based operational mode.

In some instances, one or more sub-portions or sub-periods of an access assignment period may be constructed to support media bursts (e.g., communications that are bursts of media, such as a video burst). For example, a communication may be performed in accordance with a burst operational mode having an associated encoding type and associated packet resilience; such burst operational mode may continue based upon the status of a queue within a corresponding receiver communication device. Then, based upon an indication of the status of such a queue, respective and subsequent sub-portions or sub-periods of an access assignment period may be adapted or re-organized in accordance with at least one other operational mode having a different associated encoding type and different associated packet resilience. That is to say, such adaptation may be based upon the latency tolerance of a corresponding receiver communication device. For example, one operational mode may be employed when characteristics of the queue status of the receiver communication device compare favorably to one or more decision-making parameters, and another operational mode may be employed when characteristics of that queue status compare unfavorably to the one or more decision-making parameters.

Moreover, different types of media elements may be treated differently and assigned different respective sub-reservations within an access assignment period. For example, certain types of media (e.g., audio) may be provided fixed timeslot allocations therein. Certain types of non-media communications may be provided contention based allocations therein (e.g., randomly occurring data, control signaling, management, etc. may be allocated communication medium access in accordance with a contention based operational mode). Moreover, other types of media (e.g., video) may be provided dynamically adjusted time slot allocations therein (e.g., dynamically adjusted based upon any of a number of considerations such as historical, present, future expected communication channel characteristics, device processing loading and history, etc.). As may be understood, different respective media elements will not necessarily be affected similarly by the same latency demands of control graphics. For example, certain media elements (e.g., control graphics) may have a fixed (or relatively short duration) timeslot assignment in which a request for an exchange can be made. However, other relatively static media elements (e.g., a background of a computer display) may not need to be provided any timeslot assignment in which any request for exchange is to be made. Generally speaking, different respective media elements (e.g., audio, video, photo/image, text, graphics, etc.) and different respective communication types (e.g., media, data, control, management, etc.) may be selectively provided different sub-portions or sub-periods within an access assignment period. Certain access assignment periods may be pre-determined/fixed, and other access assignment periods may be generated in real-time and/or adapted based upon any one or more considerations (e.g., operating conditions, device operating status, etc.).

Figure 6:
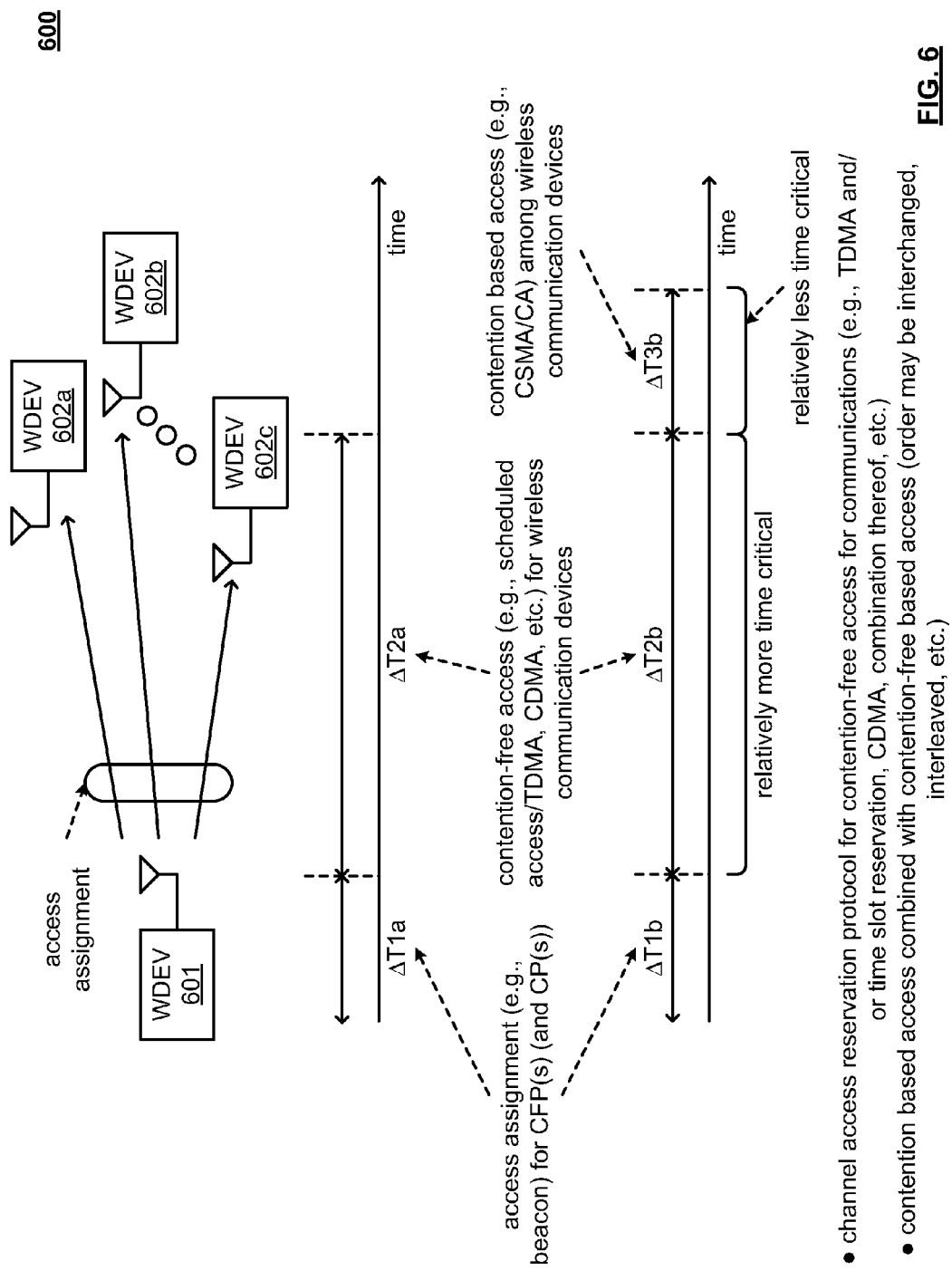
FIG. 6 is a diagram illustrating an embodiment of communication channel access assignment provided by one wireless communication device to a number of other wireless communication devices.

FIG. 6 is a diagram illustrating an embodiment 600 of communication channel access assignment provided by one wireless communication device to a number of other wireless communication devices. As can be seen with respect to this diagram, among a number of devices within a wireless communication system, one of the devices (e.g., device 601) is operative to provide an access assignment to a number of other devices 602a-602c within a wireless communication system. The access assignment may be provided via a beacon transmitted from the device 601 and received by one or more of the other devices 602a-602c. The access assignment is implemented in accordance with a sub-reservation protocol by which communication medium access will be made within a subsequent access assignment period. Such an access assignment may include respective time periods within the overall subsequent access assignment period that operate in accordance with one or more operational modes. For example, one or both of a contention-free access operational mode and a contention based operational mode may be indicated within a contention-free access operational mode to a contention based operational mode.

As also described elsewhere herein, certain contention based operational modes are not particularly amenable to ensuring acceptable delivery of media signaling between various devices within a wireless communication system. As such, certain contention-free based operational modes may be employed for effectuating communications including various forms of media between those devices within a wireless communication system. Generally speaking, a contention based operational mode operates such that one or more of the devices can compete for access to the communication medium (e.g., in accordance with CSMA/CA, etc.), and a contention-free based operational mode operates such that one or more of the devices are provided access to the communication medium in some coordinated way as to (ideally) ensure that such media signaling between the various devices may be performed within an acceptable level of service and quality.

Particularly with respect to this diagram, and access assignment is provided from the device 601 to the other devices 602a-602c at or during a first time period. A subsequent access assignment period includes a first sub-portion or sub-period that is operative in accordance with a contention-free based operational mode, and a second sub-portion or sub-period that is operative in accordance with a contention based operational mode. It is noted that the particular order by which different sub-portions or sub-periods may be allocated within an access assignment period may be varied, and alternatively implemented as with respect to this diagram (e.g., a CP may precede a CFP in other embodiments). Also, multiple respective sub-portions or sub-periods of different operational mode types (e.g., CFP(s) and/or CP(s)) may be implemented within an access assignment period.

Generally speaking, communications that are relatively more time-critical may be performed during a contention-free based operational mode access sub-portion or sub-period, and communications that are relatively less time critical, may be performed during a contention based operational mode access sub-portion or sub-period. Such a channel access reservation protocol provides for contention-free based access to the communication medium for one or more wireless communication devices within a wireless ecosystem. Again, any of a number of different contention-free based operational modes may be employed to effectuate media based communications at an acceptable level of performance.

It is noted that the device 601 and the other respective devices 602a-602c may be any number of different communication device is operative to support wireless communications. For example, the device 601 may be an access point such as in a wireless local area network (WLAN) application context, and the other respective devices 602a-602c may be the respective clients/wireless stations (STAs) therein. In alternative embodiments, the device 601 may be a game console, and the other respective devices 602a-602c may be respective user interface/handsets employed by different respective users of the gaming system (e.g., such as may be implemented in accordance with and operatively compliant with practices associated with the consumer electronics consortium (CEC)). Generally speaking, any of a number of wireless communication system applications may employ the operations, functionality, architectures, etc. as described herein.

Also, it is noted that a wireless communication device, such as an access point (AP), that intends to transmit an access assignment to one or more other wireless communication devices, may gain access to the communication medium (e.g., the air in a wireless communication system application) in accordance with certain framing and/or timing structure of the signaling between the respective wireless communication devices. For example, a wireless communication device intending to transmit an access assignment may gain access to the communication medium at a point coordinator function interframe space (PIFS) for example, within wireless local area network applications, PIFS can be used by certain of the wireless stations (STAs) therein during operation in accordance with a contention-free based period (CFP) corresponding to a point coordinator function (PCF) operational mode. That is to say, within certain applications, such as wireless local area networks (WLANs), the effectuating of providing one or more access assignments between various wireless communication devices therein may be made in accordance with such framing and/or timing structure employed within such an application.

Once the communication medium (e.g., the air) is grabbed by a given wireless communication device (e.g., an AP or a STA within a WLAN), then that wireless communication device may reserve the communication medium for a particular period of time. For example, that wireless communication device may reserve the communication medium for the entire duration of a CFP by sending one or more packets specifying the duration of the CFP to the one or more other wireless communication devices within the wireless communication system. In such an embodiment, it may be less desirable to implement one or more contention-free based periods (CFPs) and one or more contention-based periods (CPs) and an alternating type pattern.

Figure 7:
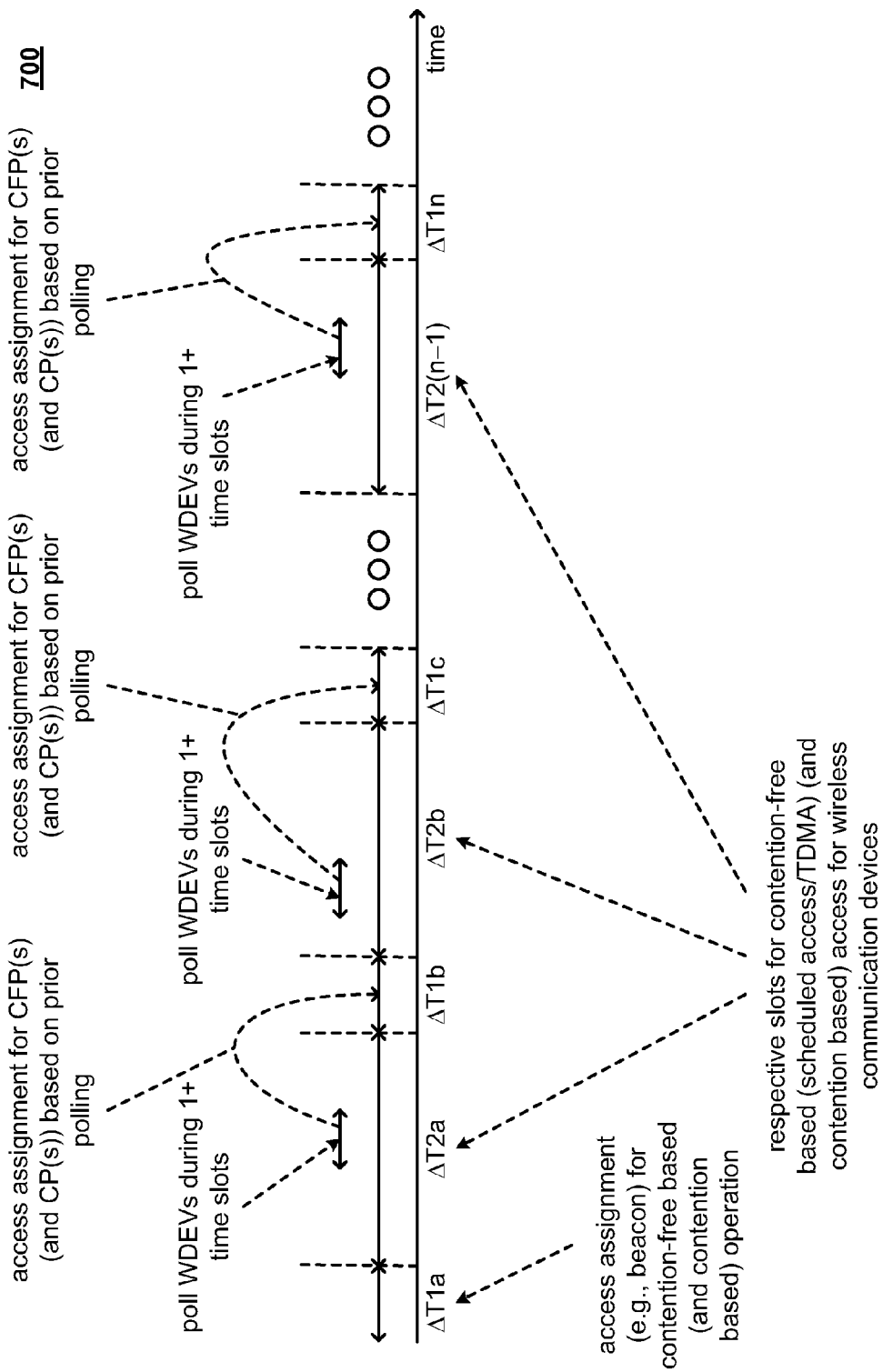
FIG. 7 is a diagram illustrating an embodiment of adaptive channel access assignment based on polling.

FIG. 7 is a diagram illustrating an embodiment 700 of adaptive channel access assignment based on polling. As can be seen with respect to this diagram, at least one device (e.g., a coordinating device such as an AP, or a STA operating with functionality associated with an AP) within a wireless ecosystem provides an access assignment to one or more other devices therein at or during a first time. Such an access assignment may be provided via a beacon that is transmitted from one of the devices to the others. The access assignment indicates one or more subsequent access assignment periods. For example, while a preferred embodiment is operative to provide an access assignment and a corresponding access assignment period on a one-to-one basis (e.g., each respective access assignment corresponds to one access assignment period), it is noted that an alternative embodiment is operative to provide an access assignment that indicates a number of subsequent corresponding access assignment periods on a one to many basis (e.g., each respective access assignment corresponds to two or more subsequent access assignment).

With respect to this diagram, each respective access assignment is followed by a corresponding access assignment period. During operation within a given access assignment period, the coordinating device performs polling of one or more of the other devices within the wireless ecosystem, and is then operative to generate a subsequent access assignment. For example, during operation within a given access assignment period, the coordinating device polls one or more the other devices to acquire information for use in generating a subsequent access assignment. In accordance with the embodiment of this diagram and/or others herein, it is noted that the other respective devices may request one or more reservations at one or more specific slots.

That is to say, one of the other devices (e.g., clients, wireless stations, etc.) being polled may provide information to the device that is performing the polling regarding a specific request for reservation of one or more specific time slots within a subsequent access assignment. Such requests as made by the other devices may be made by these other devices (e.g., clients, wireless stations (STAs), etc.) may be made by checking for current channel utilization that is indicated within a communication from the polling device. For example, in the instance in which the polling device is an access point (AP) providing beacons to other devices (e.g., clients, wireless stations (STAs), etc.), a given beacon may include such current channel utilization information. Such information may be provided by including a proprietary information element (IE) within existing packets (e.g., association requests, etc.) undergoing communication between various devices. Alternatively, some additional communication may be made between devices (e.g., between a wireless station and an AP), such as during a contention based period (CP).

In addition, it is noted that an access assignment such as may be provided from one of the wireless communication devices (e.g., an access point (AP)) to other wireless communication devices (e.g., clients, wireless stations (STAs), etc.) may be described as a bitmap or bitmask describing the particular assignment/combination of time slots and/or channels that may be employed by those other wireless communication devices for subsequent communications. In certain embodiments, such an access assignment may be transmitted from one of the wireless communication devices to the other wireless communication devices on a per-device basis. That is to say, any one given bitmap that may be transmitted from an AP could be implemented to be per associated client, such that the union of all bitmaps of all the associated clients would provide an accurate description of the assignment/combination of time slots and/or channels that may be employed by those other wireless communication devices for subsequent communications.

After completion of a given access assignment period in which one or more of the other devices have been provided communication medium access, this subsequent and adaptively generated access assignment is then provided from the coordinating device to the other devices within the wireless ecosystem. Following this adaptively generated access assignment, the one or more other devices operate in accordance with one or more respective operational modes as indicated within the adaptively generated access assignment. As can be seen, such adaptation and selectivity allows for adjustment of sub-reservations of one or more sub-portions or sub-periods within respective access assignment periods.

Each respective access assignment period need not necessarily be identical in duration, sub-portions or sub-periods therein, access operational mode types (e.g., CFP(s) and/or CP(s)) indicated therein, etc. In accordance with such adaptation, a great deal of flexibility is provided to tailor operation suitable for a given application and to be responsive to the real-time operating conditions (e.g., of the wireless communication system including respective communication channels therein, the processing status of respective wireless communication devices therein, etc.).

Figure 8:
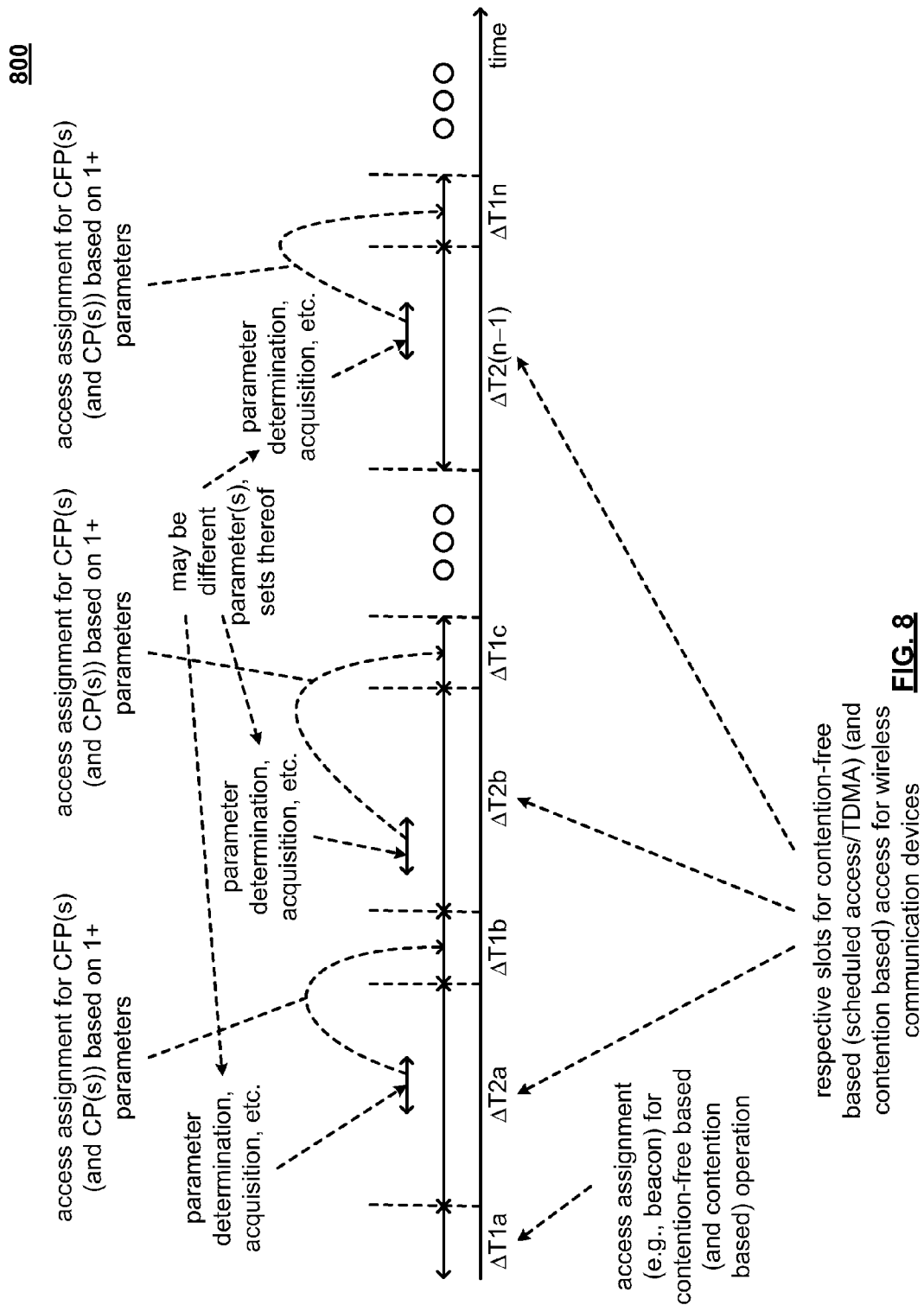
FIG. 8 is a diagram illustrating an embodiment of adaptive channel access assignment based on one or more parameters.

FIG. 8 is a diagram illustrating an embodiment 800 of adaptive channel access assignment based on one or more parameters. This diagram illustrates an alternative embodiment in which parameter determination and/or acquisition may generally be provided for use in adaptively generating respective access assignments. While the previous embodiment depicted one particular manner by which adaptive generation of respective access assignments may be made (e.g., in accordance with polling from a coordinating device within the wireless ecosystem), this embodiment generally depicts that any one or more parameters may be determined and/or acquired using any desired means.

As also mentioned with respect to other embodiments herein, while a preferred embodiment is operative to provide an access assignment and a corresponding access assignment period on a one-to-one basis (e.g., each respective access assignment corresponds to one access assignment period), it is noted that an alternative embodiment is operative to provide an access assignment that indicates a number of subsequent corresponding access assignment periods on a one to many basis (e.g., each respective access assignment corresponds to two or more subsequent access assignment).

Also, any given access assignment may be provided via a beacon that is transmitted from one of the devices to the others. The access assignment indicates one or more subsequent access assignment periods.

It is noted that the particular group of parameters which may be used to generate one access assignment may be different than another group of parameters which may be used to generate another access assignment. That is to say, a same set of parameters need not govern the generation of each respective access assignment. For example, in some embodiments, parameters that are monitored or determined solely by a coordinating device are those which are used to govern the adaptive generation of an access assignment. In alternative embodiments, parameters that are received by the coordinating device from other devices within the wireless ecosystem (e.g., acknowledgments, feedback, channel estimation, channel characterization, etc.), are employed, at least in part, by a coordinating device for use in adaptively generating a subsequent access assignment.

In addition, with respect to such adaptation functionality and operations as described herein, it is noted that any of a number of operational parameters may be selected and adapted. For example, such as in accordance with video signaling, various parameters such as data rate, frame rate, resolution, etc. may be adjusted over time. For example, considering video resolution adaptation, based upon any of a number of conditions, the video resolution may be adapted from relatively lower video resolution such as 480*i* or 480*p* upward to relatively high video resolutions such as 1080*i* or 1080*p*. In some situations, video signaling may be originally provided in accordance with relatively lower video resolutions (e.g., relatively coarse video resolutions) and modified progressively over time in accordance with relatively higher video resolutions (e.g., high definition television (HDTV), relatively refined/higher and the resolutions, etc.).

Figure 9:
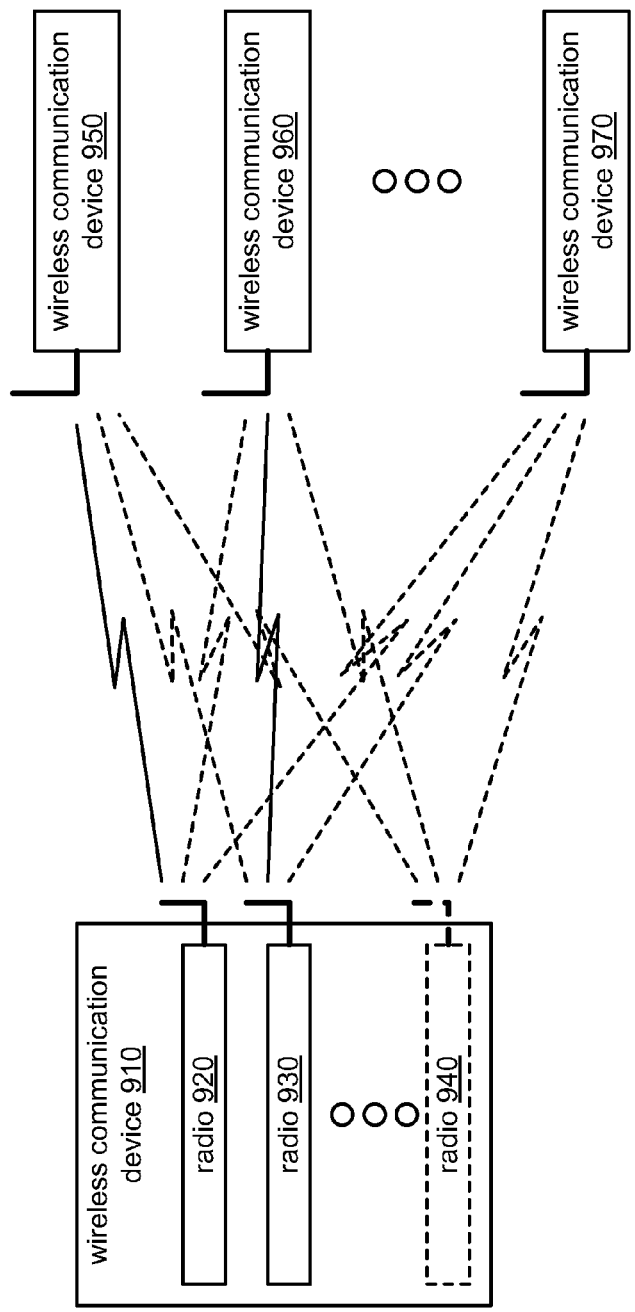
FIG. 9 is a diagram illustrating an alternative embodiment of a communication system in which at least one wireless communication device is operative to effectuate simultaneous service of more than one channel.

FIG. 9 is a diagram illustrating an alternative embodiment 900 of a communication system in which at least one wireless communication device is operative to effectuate simultaneous service of more than one channel. As can be seen with respect to this diagram, a given wireless communication device 910 may include multiple radios 930-940 therein. Such a wireless communication device 910 may be an access point, such as in accordance with a wireless local area network (WLAN/WiFi) type wireless communication system embodiment.

As such, the device 910 is operative to support simultaneous servicing of multiple respective wireless communication channels with multiple other devices 950-970. It is noted that any one or more of the other devices 950-970 may also include more than one radio implemented therein to support simultaneous servicing of more than one respective wireless communication channel.

When such a device 910, which may be a coordinating device within a wireless ecosystem, includes such capability for simultaneous servicing of communications with multiple other devices 950-970, a great deal of flexibility may be provided with respect to adaptively assigning multiple access operational modes among the respective other devices 950-970. For example, handoffs (e.g., such as selectively operating in accordance with unicast and multicast operational modes) among various respective wireless communication channels may be performed.

Figure 10:
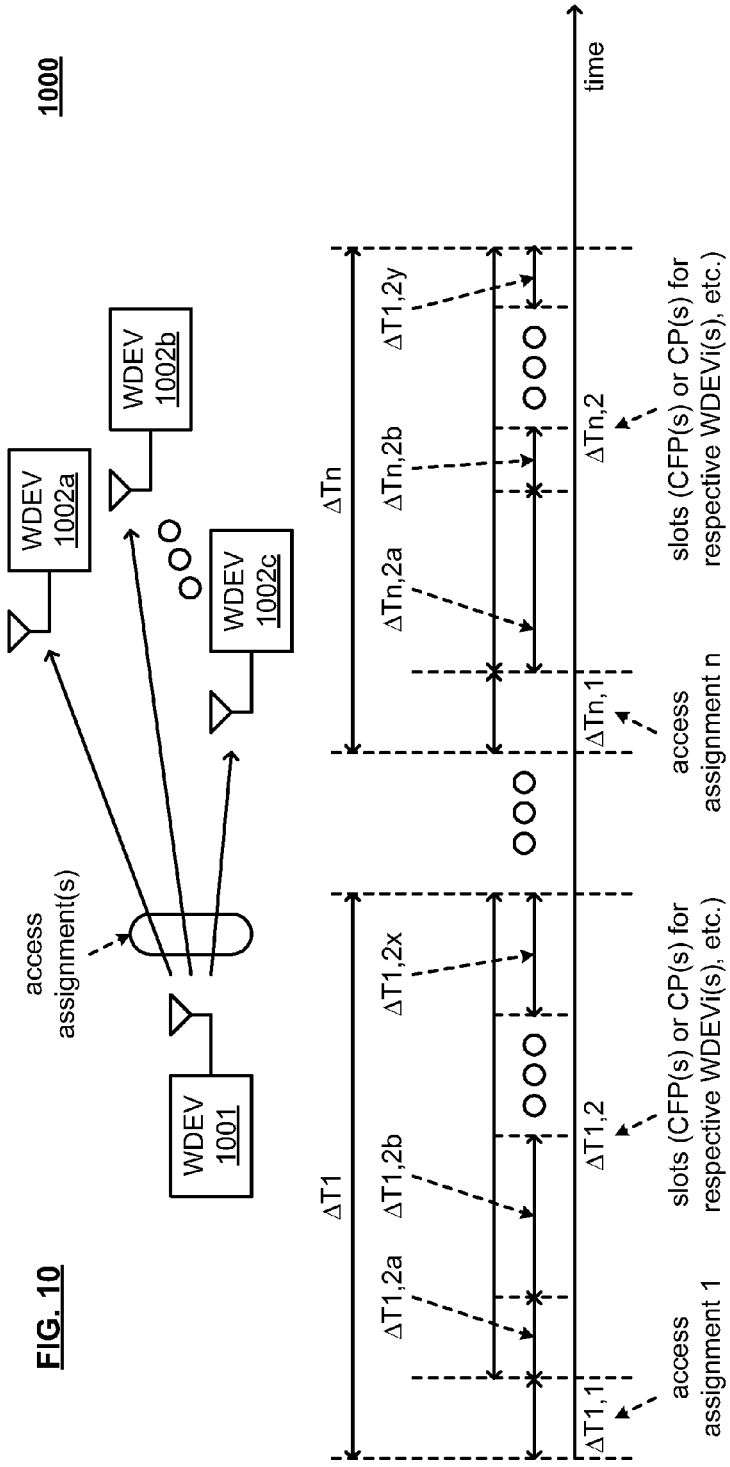
FIG. 10 is a diagram illustrating an embodiment of adaptive channel access assignment, in accordance with time division multiple access (TDMA) or time slot assignment for respective contention-free and/or contention based operations, based on one or more parameters.

FIG. 10 is a diagram illustrating an embodiment 1000 of adaptive channel access assignment, in accordance with time division multiple access (TDMA) or time slot assignment for respective contention-free based and/or contention based operations, based on one or more parameters. As can be seen with respect to this diagram, a great deal of adaptability may be effectuated with respect to different respective access assignments.

Within this diagram, a wireless communication device 1001 is operative to provide one or more access assignments to the other wireless communication devices 1002a through 1002c within the wireless communication network (e.g., the basic service set (BSS)). Based upon such access assignments, the respective wireless communication devices 1002a-1002c may perform the respective communications, which may be those to wireless communication device 1000 one or other of the wireless communication devices within the wireless communication network.

Generally speaking, each respective access assignment may be dynamically and adaptively generated based upon any of a number of various parameters. The respective parameters employed for generating each respective access assignment need not necessarily be the same. Examples of such parameters that may be used in accordance with the adaptive generation of respective access assignments include client requested information (e.g., such as in accordance with polling from a coordinating device to other devices such that those other devices provide one or more types of information), quality of service (QoS) considerations, channel traffic/conditions (which may include past, present, or future expected such conditions), the content type of various communications including associated latency tolerances thereof, prioritization among various types of communications (e.g., in accordance with some prioritization scheme among various types of communications, such as media being provided a relatively highest/first priority, control/management being provided a relatively lower, second priority, data be provided a relatively lower/third priority, etc.), a remaining or unused bandwidth portion, etc.

Moreover, different respective access assignments may relate and correspond to different groups of devices within the wireless ecosystem. For example, a first access assignment may correspond to a first sub-group of the devices within the system, a second access assignment may correspond to a second sub-group of the devices within the system, etc. Such indication of which of the overall device is to which a given access assignment on may be provided in accordance with a group address (e.g., such as in accordance with a group media access control (MAC) address as may be provided in accordance with a layer 2 communication).

As may be seen within the diagram, each respective access assignment period may have a different respective duration. Although, it is noted that certain embodiments operate using fixed duration access assignment periods. As can be seen with the diagram, any given access assignment period may be sub-divided into a number of respective slots such that each respective slot may have a corresponding operational mode associated therewith. Different access assignment periods may have different numbers of slots, different operational modes associated with their respective slots, different ordering of the respective slots, etc. For example, a given slot within a given access assignment period may be of any operational mode type (e.g., contention-free based, contention based, scheduled access, a maintenance window, a synchronization/calibration window, etc.). Again, each different access assignment periods may include different numbers of sub-divided slots therein.

Also, while in many embodiments, respective time slots that are assigned for uplink or upstream communications from the respective wireless communication devices, any respective time slot may alternatively be assigned for bidirectional communications between wireless communication device 1001 and any one of the wireless communication devices 1002a-1002c. Alternatively, any given timeslot may include a sub-portion therein that is particularly reserved for bidirectional communications. For example, a given timeslot corresponding to wireless communication device 1002b may include a sub-portion there in for supporting bidirectional communications between the wireless vacation device 1001 and the wireless communication device 1002b.

In addition, it is noted with respect to this diagram and also with respect to other embodiments herein, a given access assignment period may be divided into at least two respective sub-portions or sub-periods therein. At least one of the sub-portions or sub-periods may be contention-free based, in at least one other of the sub-portions or sub-periods may be contention based. The contention-free based sub-portion or sub-period may be particularly directed towards supporting media-based communications and/or other communications that are relatively more time critical, while the contention based sub-portion or sub-period may be particularly directed towards supporting media-based communications and/or other communications that are relatively less time critical.

Figure 11:
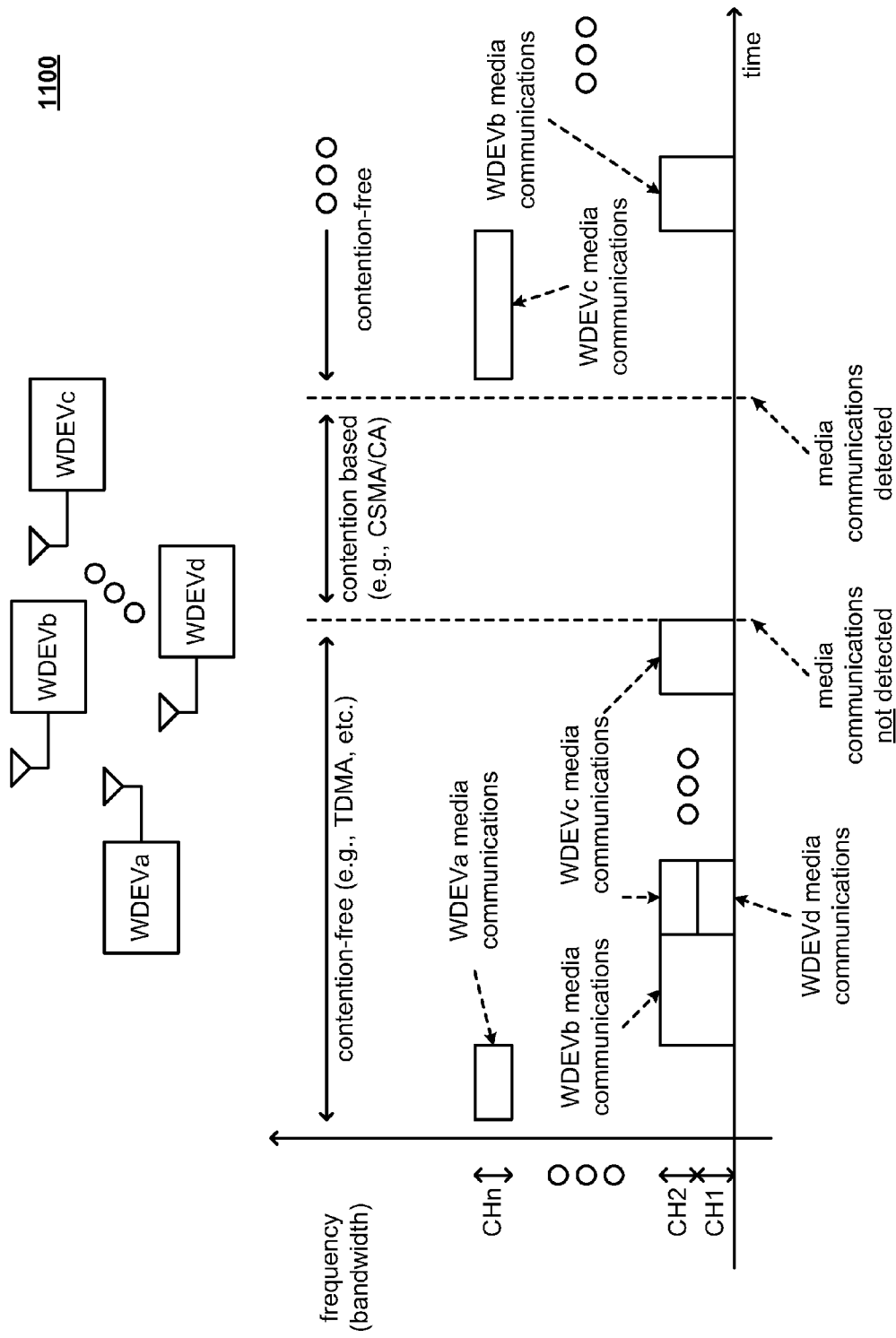
FIG. 11 is a diagram illustrating an embodiment of adaptive channel access assignment, in accordance with TDMA or time slot assignment in conjunction with respective channel assignment for respective contention-free and/or contention based operations, based on one or more parameters.

FIG. 11 is a diagram illustrating an embodiment 1100 of adaptive channel access assignment, in accordance with TDMA or time slot assignment in conjunction with respective channel assignment for respective contention-free based and/or contention based operations, based on one or more parameters. As can be seen with respect to this diagram, a given wireless communication system may include more than one wireless communication channel. For example, different respective wireless communication devices within such a wireless communication ecosystem may selectively operating using different wireless communication channels. As also mentioned with respect to other embodiments herein, certain wireless communication devices may include more than one radio to support simultaneous communications with respect to one or more other wireless communication devices. In some instances, a first radio within a device operates using a first communication channel, and a second radio within that same device operates using a second indication channel.

As can be seen with respect to this diagram, a given access assignment period may be divided into at least two respective sub-portions or sub-periods therein (e.g., one of which is contention-free based in another of which is contention based). During a contention-free based operational sub-portion or sub-period, such assignment of communication medium access may be selectively based upon the one or more channels of the wireless communication system. To effectuate wider bandwidth communications, more than one communication channel may be assigned for use by a given device at or during a given time. The use of multiple channels allows for simultaneous communications among the various devices within a wireless ecosystem. For example, in some embodiments, communications may be performed in accordance with orthogonal frequency division multiple access (OFDMA) signaling. In other embodiments, communications may be performed in accordance with multi-user multiple input multiple output (MU-MIMO), and in even other embodiments communications may be performed in accordance with a combination of orthogonal frequency division multiple access (OFDMA)/multi-user multiple input multiple output (MU-MIMO).

Generally speaking, such a sub-reservation protocol operating in accordance with in accordance with various aspects, and their equivalents, of the invention provides a great deal of selectivity by which communication medium access may be assigned to various devices within a wireless ecosystem to ensure adequate delivery of media-based communications therein. This diagram depicts some of many possible operational parameters that may be adaptively and selectively assigned for use by respective communication devices within such a wireless ecosystem. As particularly shown the effect of this diagram, any combination of time division and/or frequency division may be employed in accordance with providing communication medium access to different devices within a communication system. For example, any desired combination of timeslot division and channel (e.g., frequency) division may be effectuated in accordance with an access assignment. For example, frequency hopping may be performed by some or all of the respective communication devices therein.

In one possible embodiment, an access point (AP) may determine that two different wireless stations (STAs) [that typically operate on respective channels] intend to support communications there between, and the AP may then direct those two STAs to perform frequency hopping to make such communications on another specified channel [on which they typically do not operate] and then returned back to their original respective channels upon completion of those communications. During the time period in which those two STAs are supporting communications on the AP directed/selected channel, the AP may then use the original respective channels typically associated with those two STAs. In other words, one of the devices, such as in AP, may dynamically and adaptively decide and direct which respective channels are to be employed by the different respective devices within the system.

Referring to the diagram, it can be seen that a first device (WDEVa) is provided the opportunity to support media communications using a first channel during a first sub-portion or sub-period of a contention-free based segment (e.g., sub-portion or sub-period) of and access assignment period. Then, a second device (WDEVb) is provided the opportunity to support media communications using a combination of channels (e.g., CH1 and CH2) during a second sub-portion or sub-period of a contention-free based segment. It is noted that using a combination of channels may provide for communications using a wider bandwidth. While a combination of two channels is shown with respect to this instance, it is noted that any combination of channels may be employed for such communications. Moreover, the combination of such channels need not necessarily be adjacent channels. That is to say, a given combination of channels may include any combination of non-contiguous, non-adjacent, contiguous, and/or adjacent channels. Then, a third device (WDEVc) and a fourth device (WDEVd) are provided the opportunity to support media communications simultaneous using at least two channels, and the third device (WDEVc) is provided the opportunity to support media communications during a subsequent time and using a combination of two channels. As may be seen, a given device may be provided the opportunity to support media communications during different times, using different channel(s), etc. during different respective sub-portions or sub-periods within a given portion of an access assignment period.

Also, with respect to this diagram, the triggering event by which a subsequent access assignment is made is based upon the detection of media communications or non-media communications. For example, a given access assignment may be provided from a coordinating device to other devices within a wireless ecosystem, and such an access assignment may indicate contention-free based operation for a particular period of time. However, there may be an instance before the expiration of that particular period of time in which contention-free based operations are prescribed in which it is detected that no additional media communications need to be made by one or more the various devices within the wireless ecosystem. As such, operation may be switched to a contention based operational mode. Then, when and if it is later detected that media communications need to be made by one or more of the various devices within the wireless ecosystem, then contention-free based operations may be resumed in accordance with the prior access assignment. That is to say, based upon a detection that no media communications are to be performed, a contention-free based operational mode period of time may be selectively interrupted to allow for contention based operations until it is detected that media communications need to be made by one or more of those various devices within the wireless ecosystem.

As can be seen, in certain embodiments, even the access assignment period by which various devices within a wireless ecosystem operate may be modified based upon one or more considerations. Within a particular embodiment as depicted within this diagram, it is the detection of a need by one or more of the devices within the wireless ecosystem to support media communications that is a driving consideration that can modify an already existing access assignment period.

FIG. 12A, FIG. 12B, FIG. 13A, FIG. 13B, FIG. 14A, and FIG. 14B illustrate various embodiment of methods as may be performed in accordance with operation of various devices such as various wireless communication devices.

Referring to method 1200 of FIG. 12A, the method 1200 begins by generating an access assignment directing communication channel access for one or more wireless communication devices, as shown in a block 1210. In certain embodiments, the operations of the block 1210 may be performed within one particular wireless communication device. In alternative embodiments, the operations of the block 1210 may be performed cooperatively among two or more wireless communication devices.

The method 1200 continues by transmitting the access assignment to one or more other wireless communication devices, as shown in a block 1220. For example, one or more radios within a wireless communication device that includes the access assignment may be operative to effectuate transmitting the access assignment.

In certain embodiments, the method 1200 then operates by selectively accessing the communication channel in accordance with the access assignment, as shown in a block 1230. That is to say, the access assignment may be operative to direct communication channel access for the very wireless communication device from which the access assignment has been transmitted.

Referring to method 1201 of FIG. 12B, the method 1201 begins by generating an access assignment providing for at least one contention-free based communication channel access interval or period (CFP) and at least one contention based communication channel access interval or period (CP), as shown in a block 1211. In certain embodiments, the operations of the block 1211 may be performed within one particular wireless communication device. In alternative embodiments, the operations of the block 1211 may be performed cooperatively among two or more wireless communication devices.

The method 1201 then operates by transmitting the access assignment to one or more other wireless communication devices, as shown in a block 1221.

The method 1201 continues by selectively accessing the meet communication channel in accordance with contention-free based communication channel access based on the access assignment, as shown in a block 1231.

The method 1201 then operates by competing for communication channel access in accordance with contention based communication channel access based on the access assignment, as shown in a block 1241. Such contention based communication channel access may be in accordance with carrier sense multiple access/collision avoidance (CSMA/CA), in some embodiments.

Referring to method 1300 of FIG. 13A, the method 1300 begins by generating an access assignment providing for at least one contention-free based communication channel access interval including respective time slots for a plurality of wireless communication devices, as shown in a block 1310. As also stated with respect other embodiments herein, the operations of the block 1310 may be performed within one particular wireless communication device. In alternative embodiments, the operations of the block 1210 may be performed cooperatively among two or more wireless communication devices.

The method 1300 continues by transmitting the access assignment to one or more other wireless communication devices, as shown in a block 1320. For example, one or more radios of a given wireless communication device in which the access assignment has been generated may be operative to perform transmitting of the access assignment.

The method 1300 then operates by operating a first wireless communication device for accessing the communication channel during a first one or more timeslots in accordance with the access assignment, as shown in a block 1330.

The method 1300 continues by operating a second wireless communication device for accessing the communication channel during a second one or more timeslots in accordance with the access assignment, as shown in a block 1340.

As the reader will understand, each given wireless communication device may be provided one or more respective time slots in accordance with a given access assignment. Such timeslots need not necessarily be adjacent to one another or contiguous with respect to one another.

Referring to method 1301 of FIG. 13B, the method 1301 begins by generating an access assignment providing for at least one contention-free based communication channel access interval including respective channels for a plurality of wireless communication devices, as shown in a block 1311.

As also stated with respect other embodiments herein, the operations of the block 1311 may be performed within one particular wireless communication device. In alternative embodiments, the operations of the block 1311 may be performed cooperatively among two or more wireless communication devices.

The method 1301 then operates by transmitting the access assignment to one or more other wireless communication devices, as shown in a block 1321. For example, one or more radios of a given wireless communication device in which the access assignment has been generated may be operative to perform transmitting of the access assignment.

The method 1301 then operates by operating a first wireless communication device for accessing the communication channel via a first one or more channels in accordance with the access assignment, as shown in a block 1331.

The method 1301 then operates by operating a second wireless communication device for accessing the communication channel via a second one or more channels in accordance with the access assignment, as shown in a block 1341.

As the reader will understand, each given wireless communication device may be provided one or more respective channels in accordance with a given assignment. Such channels need not necessarily be adjacent one another or contiguous with respect to another.

Referring to method 1400 of FIG. 14A, the method 1400 begins by generating a first access assignment directing communication channel access for one or more wireless communication devices, as shown in a block 1410. As also stated with respect other embodiments herein, the operations of the block 1410 may be performed within one particular wireless communication device. In alternative embodiments, the operations of the block 1410 may be performed cooperatively among two or more wireless communication devices.

The method 1400 continues by transmitting the first access assignment to one or more other wireless communication devices, as shown in a block 1420.

The method 1400 then operates by generating a second access assignment while operating the one or more wireless communication devices in accordance with the first access assignment, as shown in a block 1430. That is to say, the method 1400 operates by generating the second access assignment directing communication channel access for the one or more wireless communication devices while the one or more wireless communication devices are operating in accordance with the first access assignment. As the reader will understand, during operation in accordance with one respective access assignment, another access assignment may be generated.

The method 1400 continues by transmitting the second access assignment to one or more other wireless communication devices, as shown in a block 1440.

Referring to method 1401 of FIG. 14B, the method 1401 begins by operating one or more wireless communication devices via contention-free based communication channel access in accordance with an access assignment, as shown in a block 1411.

The method 1401 then operates by monitoring whether media communications are being communicated, as shown in a block 1421. For example, even though an access assignment may provide for different respective wireless communication devices to communicate respective media communications, certain of those wireless communication devices may have no media communications to make during a given time interval provided therefore. Alternatively, all of the necessary media communications for a given access assignment may have already been made. In some instances, before the expiration of the access assignment, all necessary media communications may have completed.

Before the expiration of the access assignment (e.g., before the end of scheduled contention-free based access to a communication channel of one or more wireless communication devices), the method 1401 continues by terminating operation in accordance with the access assignment before the expiration of the access assignment. That is to say, even before the expiration of a given access assignment (or at least before the expiration of the contention-free based communication channel access portion thereof), when no media communications are detected as being made, operation in accordance with contention-free based communication channel access may be terminated, as shown in a block 1431.

The method 1401 then operates by operating one or more wireless communication devices via contention based communication channel access, as shown in a block 1441. That is to say, before the expiration of the contention-free based communication channel access as provided for within the access assignment, the mode of operation is switched to contention-free based communication channel access. B It is also noted that the various operations and functions as described with respect to various methods herein may be performed within one or more wireless communication device. For example, such a wireless communication device may include a baseband processing module and or circuitry implemented therein (e.g., such as in accordance with the baseband processing module as described with reference to FIG. 2) and/or other components therein. For example, such a baseband processing module can perform generation of different respective access assignments in accordance with various aspects of the invention, and/or any other operations and functions as described herein, etc. or their respective equivalents.

It is noted that the various modules and/or circuitries (baseband processing modules and/or circuitries, encoding modules and/or circuitries, decoding modules and/or circuitries, etc., etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory (ROM), random access memory (RAM), volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

It is also noted that any of the connections or couplings between the various modules, circuits, functional blocks, components, devices, etc. within any of the various diagrams or as described herein may be differently implemented in different embodiments. For example, in one embodiment, such connections or couplings may be direct connections or direct couplings there between. In another embodiment, such connections or couplings may be indirect connections or indirect couplings there between (e.g., with one or more intervening components there between). Of course, certain other embodiments may have some combinations of such connections or couplings therein such that some of the connections or couplings are direct, while others are indirect. Different implementations may be employed for effectuating communicative coupling between modules, circuits, functional blocks, components, devices, etc. without departing from the scope and spirit of the invention.

Various aspects of the present invention have also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Various aspects of the present invention have been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, various aspects of the present invention are not limited to such embodiments. It will be obvious to one of average skill in the art that various changes and modifications may be practiced within the spirit and scope of the invention, as limited only by the scope of the appended claims.

MODE SELECTION TABLES

TABLE 1

| 2.4 GHz, 20/22 MHz channel BW, 54 Mbps max bit rate | | | | | | | | | |
|---|---|---|---|---|---|---|---|---|---|
| Rate | Modulation | Code Rate | NBPSC | NCBPS | NDBPS | EVM | Sensitivity | ACR | AACR |
| | Barker | | | | | | | | |
| 1 | BPSK | | | | | | | | |
| | Barker | | | | | | | | |
| 2 | QPSK | | | | | | | | |
| 5.5 | CCK | | | | | | | | |

TABLE 1-continued 2.4 GHz, 20/22 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 11 | CCK | | | | | | | | |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 2

Channelization for Table 1

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 3

Power Spectral Density (PSD) Mask for Table 1
PSD Mask 1

| Frequency Offset | dBr |
|---|---|
| −9 MHz to 9 MHz | 0 |
| +/−11 MHz | −20 |
| +/−20 MHz | −28 |
| +/−30 MHz and greater | −50 |

TABLE 4

5 GHz, 20 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 5

Channelization for Table 4

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 6

2.4 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 7

Channelization for Table 6

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 8

5 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 9 channelization for Table 8

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 10

5 GHz, with 40 MHz channels and max bit rate of 486 Mbps

| Rate | TX Antennas | ST Code Rate | Modulation | Code Rate | NBPSC |
|---|---|---|---|---|---|
| 13.5 Mbps | 1 | 1 | BPSK | 0.5 | 1 |
| 27 Mbps | 1 | 1 | QPSK | 0.5 | 2 |
| 54 Mbps | 1 | 1 | 16-QAM | 0.5 | 4 |
| 108 Mbps | 1 | 1 | 64-QAM | 0.666 | 6 |
| 121.5 Mbps | 1 | 1 | 64-QAM | 0.75 | 6 |
| 27 Mbps | 2 | 1 | BPSK | 0.5 | 1 |
| 54 Mbps | 2 | 1 | QPSK | 0.5 | 2 |
| 108 Mbps | 2 | 1 | 16-QAM | 0.5 | 4 |
| 216 Mbps | 2 | 1 | 64-QAM | 0.666 | 6 |
| 243 Mbps | 2 | 1 | 64-QAM | 0.75 | 6 |
| 40.5 Mbps | 3 | 1 | BPSK | 0.5 | 1 |
| 81 Mbps | 3 | 1 | QPSK | 0.5 | 2 |
| 162 Mbps | 3 | 1 | 16-QAM | 0.5 | 4 |
| 324 Mbps | 3 | 1 | 64-QAM | 0.666 | 6 |
| 365.5 Mbps | 3 | 1 | 64-QAM | 0.75 | 6 |
| 54 Mbps | 4 | 1 | BPSK | 0.5 | 1 |
| 108 Mbps | 4 | 1 | QPSK | 0.5 | 2 |
| 216 Mbps | 4 | 1 | 16-QAM | 0.5 | 4 |
| 432 Mbps | 4 | 1 | 64-QAM | 0.666 | 6 |
| 486 Mbps | 4 | 1 | 64-QAM | 0.75 | 6 |

TABLE 11

Power Spectral Density (PSD) mask for Table 10
PSD Mask 2

| Frequency Offset | dBr |
|---|---|
| −19 MHz to 19 MHz | 0 |
| +/−21 MHz | −20 |
| +/−30 MHz | −28 |
| +/−40 MHz and greater | −50 |

TABLE 12

Channelization for Table 10

| Channel | Frequency (MHz) | Country | Channel | Frequency (MHz) | County |
|---|---|---|---|---|---|
| 242 | 4930 | Japan | | | |
| 250 | 4970 | Japan | | | |
| 12 | 5060 | Japan | | | |
| 38 | 5190 | USA/Europe | 36 | 5180 | Japan |
| 46 | 5230 | USA/Europe | 44 | 5520 | Japan |
| 54 | 5270 | USA/Europe | | | |
| 62 | 5310 | USA/Europe | | | |
| 102 | 5510 | USA/Europe | | | |
| 110 | 5550 | USA/Europe | | | |
| 118 | 5590 | USA/Europe | | | |
| 126 | 5630 | USA/Europe | | | |
| 134 | 5670 | USA/Europe | | | |
| 151 | 5755 | USA | | | |
| 159 | 5795 | USA | | | |

What is claimed is:

1. A wireless communication device comprising:
   a communication interface; and
   a processor, the processor and the communication interface configured to:
   process a plurality of communications that is intended for a plurality of wireless communication devices to determine characteristics of the plurality of communications;
   generate a first access assignment for communication medium access for the plurality of wireless communication devices for a first period of time based on the characteristics of the plurality of communications, wherein the first access assignment specifies first time slots for first communications of a first type that are intended for first at least one of the plurality of wireless communication devices, wherein the first access assignment specifies second time slots that is different than the first time slots for second communications of a second type that are intended for second at least one of the plurality of wireless communication devices;
   transmit the first access assignment to the plurality of wireless communication devices;
   support the first communications with the first at least one of the plurality of wireless communication devices based on the first time slots and support the second communications with the second at least one of the plurality of wireless communication devices based on the second time slots during the first period of time;
   transmit at least one poll frame to the plurality of wireless communication devices during the first period of time when the first communications and the second communications are supported;
   receive, from the first and second at least one of the plurality of wireless communication devices in response to the at least one poll frame, queue status information of the first and second communications within the first and second at least one of the plurality of wireless communication devices;
   generate a second access assignment for communication medium access for the plurality of wireless communication devices for a second period of time based on the status information and the characteristics of the plurality of communications, wherein the second access assignment specifies third time slots for the first communications of the first type that are intended for the first at least one of the plurality of wireless communication devices and also specifies fourth time slots for the second communications of the second type that are intended for the second at least one of the plurality of wireless communication devices;
   transmit the second access assignment to the plurality of wireless communication devices; and
   continue to support the first communications with the first at least one of the plurality of wireless communication devices based on the third time slots and continue to support the second communications with the second at least one of the plurality of wireless communication devices based on the fourth time slots during the second period of time.

2. The wireless communication device of claim 1, wherein first access assignment specifies contention-free based communication medium access based on the first time slots and the second time slots and also specifies another period of time for contention-based communication medium access for the plurality of wireless communication devices that is based on carrier sense multiple access/collision avoidance (CSMA/CA).

3. The wireless communication device of claim 1 further comprising:
   a wireless communication device that includes the communication interface and the processor and that also includes:
   at least one additional communication interface; and
   at least one additional processor configured to support, via the at least one additional communication interface, simultaneous communications with at least two of the plurality of wireless communication devices.

4. The wireless communication device of claim 1, wherein the processor and the communication interface are further configured to:
   support the first communications, via the communication interface, with a first of the plurality of wireless communication devices during a first time interval; and
   support the second communications, via the communication interface, with a second of the plurality of wireless communication devices during a second time interval.

5. The wireless communication device of claim 1, wherein the processor and the communication interface are further configured to:
   support the first communications, via the communication interface, with a first of the plurality of wireless communication devices via a first of a plurality of communication channels; and
   support the second communications, via the communication interface, with a second of the plurality of wireless communication devices via a second of a plurality of communication channels.

6. The wireless communication device of claim 1 further comprising:
   an access point (AP), wherein the plurality of wireless communication devices include a plurality of wireless stations (STAs).

7. The wireless communication device of claim 1, wherein the processor and the communication interface are further configured to:
   support the first communications or the second communications based on at least one of orthogonal frequency division multiple access (OFDMA) signaling or multi-user multiple-input-multiple-output (MU-MIMO) signaling.

8. The wireless communication device of claim 1, wherein:
   the first communications include video media based on a first video resolution;

the second communications include the video media based on a second video resolution that is relatively higher than the first video resolution; and
the second time slots occupy relatively more time than the first time slots within the first period of time.

9. A wireless communication device comprising:
a communication interface; and
a processor, the processor and the communication interface configured to:
 transmit a first poll frame to a plurality of wireless communication devices;
 receive, from the plurality of wireless communication devices and in response to the first poll frame, first queue status information within the plurality of wireless communication devices based on prior burst video communications received from the wireless communication device;
 generate a first access assignment for communication medium access for the plurality of wireless communication devices during a first period of time based on the first queue status information, first characteristics of first burst video communications within the wireless communication device intended for first at least one of the plurality of wireless communication devices, and second characteristics of second burst video communications within the wireless communication device intended for second at least one of the plurality of wireless communication devices, wherein the first access assignment specifies first time slots for the first burst video communications and second time slots for the second burst video communications;
 transmit the first access assignment to the plurality of wireless communication devices and subsequently transmit the first burst video communications to the first at least one of the plurality of wireless communication devices within the first time slots and the second burst video communications to the second at least one of the plurality of wireless communication devices within the second time slots;
 transmit a second poll frame to a plurality of wireless communication devices when transmitting the first and the second burst video communications during the first period of time;
 receive, from the plurality of wireless communication devices and in response to the second poll frame, second queue status information within the plurality of wireless communication devices based on the first and the second burst video communications received from the wireless communication device; and
 generate a second access assignment for communication medium access for the plurality of wireless communication devices during a second period of time based on the second queue status information.

10. The wireless communication device of claim 9, wherein the processor and the communication interface are further configured to:
 generate the first access assignment for communication medium access for the plurality of wireless communication devices, wherein the first access assignment also specifies another period of time within the first period of time for contention-based communication medium access for the plurality of wireless communication devices that is based on carrier sense multiple access/collision avoidance (CSMA/CA).

11. The wireless communication device of claim 9, wherein the processor and the communication interface are further configured to:
 transmit the first burst video communications to the first at least one of the plurality of wireless communication devices within the first time slots using at least one of first data rate, first frame rate, and first resolution; and
 transmit the second burst video communications to the second at least one of the plurality of wireless communication devices within the second time slots using at least one of second data rate, second frame rate, and second resolution that are different than the at least one of first data rate, first frame rate, and first resolution.

12. The wireless communication device of claim 9, wherein the processor and the communication interface are further configured to:
 transmit at least one of the first burst video communications or the second burst video communications based on at least one of orthogonal frequency division multiple access (OFDMA) signaling or multi-user multiple-input-multiple-output (MU-MIMO) signaling.

13. The wireless communication device of claim 9, wherein:
 the first burst video communications are based on a first video resolution;
 the second burst video communications are based on a second video resolution that is relatively higher than the first video resolution; and
 the second time slots occupy relatively more time than the first time slots within the first period of time.

14. The wireless communication device of claim 9 further comprising:
 an access point (AP), wherein the plurality of wireless communication devices include a plurality of wireless stations (STAs).

15. A method for execution by a wireless communication device, the method comprising:
 transmitting a first poll frame to a plurality of wireless communication devices;
 receiving, from the plurality of wireless communication devices and in response to the first poll frame, first queue status information within the plurality of wireless communication devices based on prior burst video communications received from the wireless communication device;
 generating a first access assignment for communication medium access for the plurality of wireless communication devices during a first period of time based on the first queue status information, first characteristics of first burst video communications within the wireless communication device intended for first at least one of the plurality of wireless communication devices, and second characteristics of second burst video communications within the wireless communication device intended for second at least one of the plurality of wireless communication devices, wherein the first access assignment specifies first time slots for the first burst video communications and second time slots for the second burst video communications;
 transmitting, via a communication interface of the wireless communication device, the first access assignment to the plurality of wireless communication devices and subsequently transmit the first burst video communications to the first at least one of the plurality of wireless communication devices within the first time slots and the second burst video communications to the second at least one of the plurality of wireless communication devices within the second time slots;
 transmitting, via a communication interface of the wireless communication device, a second poll frame to a plurality of wireless communication devices when transmitting the first and the second burst video communications during the first period of time;

receiving, from the plurality of wireless communication devices and in response to the second poll frame, second queue status information within the plurality of wireless communication devices based on the first and the second burst video communications received from the wireless communication device; and generating a second access assignment for communication medium access for the plurality of wireless communication devices during a second period of time based on the second queue status information.

16. The method of claim 15 further comprising:
generating the first access assignment for communication medium access for the plurality of wireless communication devices, wherein the first access assignment also specifies another period of time within the first period of time for contention-based communication medium access for the plurality of wireless communication devices that is based on carrier sense multiple access/collision avoidance (CSMA/CA).

17. The method of claim 15 further comprising:
transmitting the first burst video communications to the first at least one of the plurality of wireless communication devices within the first time slots using at least one of first data rate, first frame rate, and first resolution; and
transmitting the second burst video communications to the second at least one of the plurality of wireless communication devices within the second time slots using at least one of second data rate, second frame rate, and second resolution that are different than the at least one of first data rate, first frame rate, and first resolution.

18. The method of claim 15 further comprising:
transmitting at least one of the first burst video communications or the second burst video communications based on at least one of orthogonal frequency division multiple access (OFDMA) signaling or multi-user multiple-input-multiple-output (MU-MIMO) signaling.

19. The method of claim 15, wherein:
the first burst video communications are based on a first video resolution;
the second burst video communications are based on a second video resolution that is relatively higher than the first video resolution; and
the second time slots occupy relatively more time than the first time slots within the first period of time.

20. The method of claim 15, wherein the wireless communication device is an access point (AP), and the another wireless communication device includes a wireless station (STA).

\* \* \* \* \*